(12) United States Patent
Hitchcock et al.

(10) Patent No.: US 6,345,278 B1
(45) Date of Patent: Feb. 5, 2002

(54) UNIVERSAL FORMS ENGINE

(75) Inventors: Michael D. Hitchcock, Portland; James H. Wolfston, Jr., West Linn; John W. Stedman; Andreè J. Hertz, both of Beaverton; Raymond L. Price, Tualatin, all of OR (US)

(73) Assignee: CollegeNET, Inc., Portland, OR (US)

( * ) Notice: Subject to any disclaimer, the term of this patent is extended or adjusted under 35 U.S.C. 154(b) by 0 days.

(21) Appl. No.: 09/325,533

(22) Filed: Jun. 3, 1999

Related U.S. Application Data

(60) Provisional application No. 60/088,123, filed on Jun. 4, 1998.

(51) Int. Cl.[7] ............................................. G06F 17/30
(52) U.S. Cl. ...................... 707/100; 707/102; 707/104; 707/506; 707/507
(58) Field of Search ............................ 707/100, 1, 10, 707/505, 506, 507, 508, 102, 104

(56) References Cited

U.S. PATENT DOCUMENTS

| | | | |
|---|---|---|---|
| 5,404,294 A | 4/1995 | Karnik | 707/507 |
| 5,450,537 A | 9/1995 | Hirai et al. | 707/507 |
| 5,489,213 A | 2/1996 | Makipaa | 434/322 |
| 5,535,321 A | 7/1996 | Massaro et al. | 345/337 |
| 5,572,643 A | 11/1996 | Judson | 709/218 |
| 5,640,577 A | 6/1997 | Scharmer | 707/507 |
| 5,701,451 A | 12/1997 | Rogers et al. | 707/1 |
| 5,706,434 A | 1/1998 | Kremen et al. | 709/218 |
| 5,710,883 A | 1/1998 | Hong et al. | 382/228 |
| 5,710,918 A | 1/1998 | Lagarde et al. | 707/10 |
| 5,737,592 A | 4/1998 | Nguyen et al. | 707/4 |
| 5,774,887 A | 6/1998 | Wolff et al. | 707/1 |
| 6,026,187 A * | 2/2000 | Siegel | 382/213 |
| 6,192,380 B1 * | 2/2001 | Light et al. | 707/505 |
| 6,199,079 B1 * | 3/2001 | Gupta et al. | 707/507 |

FOREIGN PATENT DOCUMENTS

| | | | |
|---|---|---|---|
| EP | WO 98/04976 | 2/1998 | G06F/13/00 |
| EP | 0 918 424 A2 | 5/1999 | H04L/29/06 |

* cited by examiner

*Primary Examiner*—Sanjiv Shah
(74) *Attorney, Agent, or Firm*—Michael O. Scheinberg

(57) ABSTRACT

A forms engine allows data sharing between customizable on-line forms, such as college admissions applications. After an applicant completes an application, the data is saved in a database and automatically populates fields in subsequent application forms. Each form is branded for its institution and forms for different institutions differ in appearance and content so that the presence of the third party servicer is transparent to the applicant. The system is extensible without programming, allowing new applicant attributes to be readily incorporated into the system and allowing the content and appearance of the application to be readily changed by changing the description file. Information stored about each attribute allows the specification of data validation rules and data sharing and grouping rules, as well as dependency rules that permit application page content to depend on applicant's responses on a previous page.

42 Claims, 32 Drawing Sheets

42

Online Applications

*Before You Apply...*

52 → 1-<u>Create Your Account</u>

68 → 2-<u>Directions & Information</u>

72 → 3-<u>Apply to Lewis & Clark College</u>

*After You Apply...*

74 → <u>*Review Your Personal Log*</u>

76 → <u>*Change Your Password*</u>

36

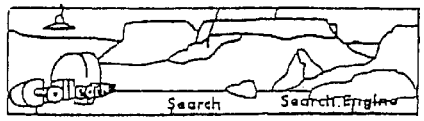
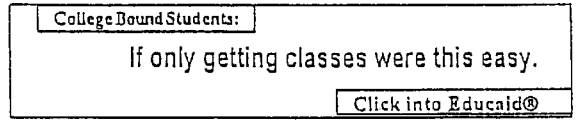
CollegeNET Online Application Schools
[APPLY] Online Application available now
[APPLY] Online Application under construction
Four year US colleges
Matching schools: 1
38 — [APPLY] Lewis & Clark College
Portland, OR
_____ _CollegeNET®_____
©1997 Universal Algorithms, Inc.
40
FIG. 3

54

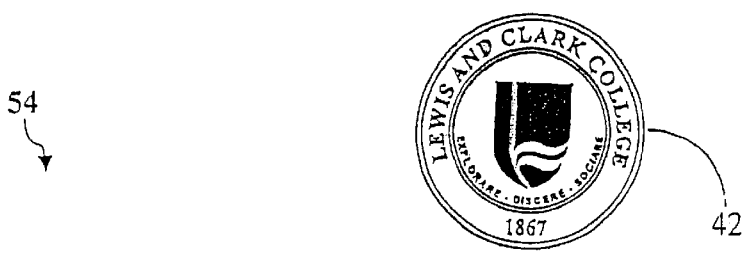

42

Create a New Apply Web Account

Once created, your account can be used to save and re-edit all of your applications on the ApplyWeb system, as well as submit your applications to the admissions department. Be sure to remember your username and password.

User Info

The information you enter here will be automatically entered into each ApplyWeb application that you complete. We recommend you use your full legal name. You will not be able to change your name information once you have created your account, so please fill in these fields as you would like them to appear on an actual application.

Last Name: [          ]

First Name: [          ]

Phone (XXX-XXX-XXXX): [          ]

E-mail Address (opt): [          ]

ApplyWeb Username

Enter up tp 8 characters for your desired username below. Lowercase letters & numbers only.
Note when choosing a user name: Your user name will be a part of your user id when your application is sent to an admissions office.

Username: [          ]

ApplyWeb Password

Enter your password twice - be sure there were no mistakes.
Passwords must be at least 7 characters. Spaces are not allowed.

New Password: [          ]

New Password (again): [          ]

[Create My Account] [Clear Form]

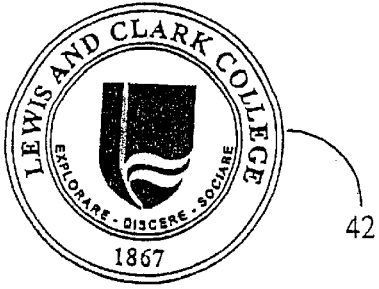
42

Welcome! Your new account has been created and is available for all college applications on the ApplyWeb system. Please make a note of your username and password as your account will not be accessible without them.

<div align="center">Directions and Information</div>

| Application Features | Instructions Menu |
|---|---|
| • No checks to write! You <u>pay your application fee on-line</u>.<br>• You can <u>complete the application over multiple sessions</u>.<br>• Your data is <u>securely stored</u> and <u>transmitted</u>.<br>• You'll <u>save time</u> by not having to retype data on different forms.<br>• You'll know immediately when the school <u>receives your application</u>. | • <u>Application Instructions</u><br>• <u>Hints for filling out applications</u><br>• <u>If you have problems accessing web forms</u><br>• <u>Web application features</u><br>• <u>Scholarship Eligibility</u><br><br>Go to Step 3:<br><br>• <u>Apply to Lewis & Clark College</u> |

<div align="center">Find out how to become eligible for a <u>scholarship</u>!</div>

---

Application instructions

1. Establish your <u>account</u>.
   Enter your account information exactly as instructed on the form.
   Click [ Create My Account ]

Write down your user name ans password for future reference when re-entering this system.

2. Fill out your application.
   You can complete your application in any order and save your work and come at a later time - Even from a different computer! When you've completed te application or are ready to exit, click <div align="center">FIG. 6a</div>

70 

[Save This Page] to save only click [Save/Pay/Send] to file your completed application.

If your application has more than one page, use 'Save and go to page: [1][2][3] to move to another page.

All of your saves and transmissions are logged in your Personal Log for your review.

3. Make corrections to your data
   You may see a Data Correction Page when you move from page to page or chose
   [Save/Pay/Send]   These appear if you have omitted a required field or entered data incorrectly.
   Changes you need to make appear in red text. Simply enter the correct data, scroll down to the bottom of the page and click [Make These Corrections]

4. Save/Pay/Send your application.
   When you have completed your application, click the [Save/Pay/Send] button at the bottom of the last page. This saves your data in its final form and takes you to the payment screen where you pay your application fee on-line.

NOTE: The application is not sent to the school until your payment is authorized.

5. Pay your application fee on-line.
   When you click [Save/Pay/Send], you are taken to the payment screen where you fill in your credit card information. Fill in all the information, including the complete credit card number, expiration date, and card billing information, and click [Submit this information]

*Security Information:* All your credit card information is encrypted while it goes between your browser and our server, as well as during authorization. None of this information is stored in our database.

Once payment is authorized your application is on its way to the school and you will not be able to change data on your application for that term.

6. Close your browser program when you're ready to end your Web session. This clears your password and secure connection.

7. To re-enter your application form:
   Return to the Application Menu and click on the application you would like to complete.
   Enter your user name and password when prompted.

8. Check your Personal Log to print a copy of your application (once payment has been authorized) or to find out if a school has received it yet.

Hints for filling out applications
* Use the correct postal code for US state and Canadian province names. (view codes)
   Use the correct internet country code for country abbreviations. (view codes)

> The "(view codes)" link opens a new browser window. To return to your application simply close the new window

- Fill in high school, college, and job information in reverse chronological order. For example, in a table where you're asked to list the high school you've attended, write the most recently attended one in the top row of the table, the next most recently attended in the second row, and so on.
- Separate digits in social security and telephone numbers with dashes only, no slashes or parentheses.
- Be sure to check your application carefully before sending it!
- There are usually other requirements for admission such as having transcripts, test scores, or recommendations sent to the school. Be sure to fulfill these requirements as well as submitting your application.

If you have problems accessing web forms

If you encounter problems accessing web application forms, it may be because you need to download a later version of your browser program. To determine if this is the problem and to download a new version if needed:
1. Access the Browser Diagnostic form.
2. Follow the instructions on the Debug form tot est your current browser and download a later version if you need to.

Web Application Features

- The web application server stores the information you enter under the private user name and password you establish.

- Nothing you enter on an application form is sent to the institution until you transmit it. That means you can set up your account, fill out information on an application form, change it, and save it free of charge and without worry of disclosing information to the institution before you're ready.

- You don't have to complete an application in one sitting. For example, you can start working on an application at your library's web terminal, save your work, recall it from your web terminal at home, and continue working from there. Wherever you have access tot he web, you have access to the information you've saved.

- When you fill out more than one application form, ApplyWeb automatically enters common information you filled in on the first form in all subsequent forms. For example, if you've entered you name and address on an application form and saved it, ApplyWeb will automatically write that information on the next form you call up (assuming, of course, that the nest form also has name and address fields). Also, if you change the information on one form, it's changed on all others. This feature can save you a lot of time and typing when you're applying to more than one ApplyWeb institution.

- Your data is transmitted securely over the Internet. The information you enter is encrypted and secure when you save it and when you send it. Although general data collected on the system may be used in statistical studies and reports designed to assist institutions with planning, any information bearing your personal identification is only disclosed to the institutions you send it to.

FIG. 6c

70 

- When you save or transmit application information, a note appears in your Personal Log. You can easily check your Personal Log to see a record of your system activity. Your Personal Log also tells you when an institution has acknowledged receipt of your application.

Scholarship Eligibility

- Upon submitting your web application you become automatically eligible for a number of scholarships awarded by CollegeNET. In 1997, these awards totaled $9,000. For details visit www.CollegeNET.com/scholarships/.

Go to Step 3:
72 → Apply to Lewis & Clark College

Application Options

Lewis & Clark College

84 • Application Instructions
Read this section carefully before completing the application 86 • Application Supplemental Form (please print)

92 • Counselor's Report

92 • Teacher's Recommendation

Main Menu

82

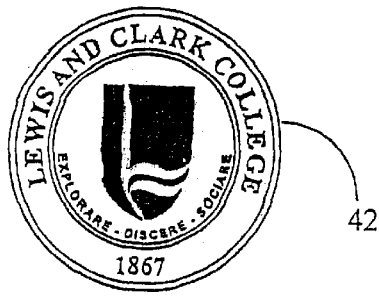

42

We welcome your interest in <u>Lewis & Clark College</u> and are glad that you've chosen to apply to the College using CollegeNet. We look forward to working with you in the admission process. We have outlined a variety of application options below. We have also provided a checklist of credentials required for a complete file for first-year and transfer applicants. Please read this information carefully, print it out and keep it for future reference. Completed references, transcripts, test scores, and other documents will be added to your file as they arrive.

If you have any questions about the College or the application process, please contact us. We will be glad to assist you. Since several parts of your application will need to come to us in paper (i.e. recommendations, transcript), these documents should be addressed to:

Office of Admissions
    Lewis & Clark College
    0615 S.W. Palatine Hill Road
    Portland, Oregon 97219-7899

First - Year Application Options

Early Action (Nonbinding) : Fall Semester
*1997-98: 614 applied, 574 admitted (93%)*
Students who have determined early in the fall that Lewis & Clark is among their top choices should use the Early Students Action Plan. Applicants under Early Action must apply and submit all supporting documents by December 1. Notification of the Admissions Committee's decision will be mailed by January 15. Admitted students may submit the reservation deposit any time before May 1.

Regular Decision: Fall Semester
*1997-98: 2,701 applied, 1,645 admitted (61%)*
Students who select this option should apply and submit all supporting documents by February 1. Notification of the Admissions Committee's decision will be mailed no later than April 1. Students whose applications are received after February 1 may be notified after April 1. To ensure a place in the class, admitted students must submit the reservation deposit by May 1.

Regular Decision: Spring Semester
*Spring 1998: 20 Applied, 13 admitted (65%)*
Students seeking admission for the spring semester should apply and submit all supporting documents by December 1. Notification of the admission decision will be made as soon as possible after all required materials have been received. Admitted students must submit their reservation deposit within two weeks of the date on their letter of admission.

FIG. 8a

94 

Transfer Admission
*1997-98: 287 applied, 149 admitted (52%)*
We welcome the diversity and maturity transfer students bring to the College. Transfer applicants can apply for either fall or spring semester and are evaluated on a rolling basis. Notification of the admission decision will be made within three weeks after all required materials have been received. Some transfer applicants decide later in the spring to apply; they are encouraged to get all credentials to us as soon as possible to ensure a smooth transition to the College. Late spring and early summer applicants may find financial aid resources and housing options limited. Please note that the priority filing deadline for financial aid is March 1. Applicants for spring semester must submit all credentials by December 1.

Portfolio Path to Admission
Lewis & Clark has offered this alternative application plan since 1991. The key elements of the Portfolio Path, in addition to the requirements on the checklist that follows, are the submission of three academic teacher recommendations and at least five samples of academic work. Students also have the option of requesting that their school remove standardized test scores from transcripts before they are submitted to Lewis & Clark. Portfolio materials must include at least one graded writing sample. Other materials may include, but are not limited to: term papers; personal journals; science projects or lab reports; essay tests; audio, video, or slide examples of talent in the fine arts. Students sending original work they wish to have returned should include an appropriate self-addressed, stamped envelope, tube, or other shipping container.

International Students
Applicants to the undergraduate program (or to both the undergraduate program and the Institute for the Study of American Language and Culture) who do not hold U.S. citizenship or Permanent Residency may request an International Student Application from the Office of International Student Services (iso@lclark.edu). This application may be obtained in hard copy or downloaded from the international student admissions home page on the Lewis & Clark Web Site.

International students attending school in the United States or international schools abroad can also use the application materials provided here. In addition to these materials, however, each international student applicant is required to submit a Certificate of Financial Responsibility. This form is available on request from the Office of International Student Services (iso@lclark.edu) or from their Web Site.
All applicants who are not U.S. citizens or Permanent Residents should submit their application materials to:

> International Student Services
> Lewis & Clark College
> 0615 S.W. Palatine Hill Road
> Portland, Oregon 97219-7899
> Phone: 503-768-7305
> Fax: 503-768-7301
> Internet: iso@lclark.edu
> WWW: http://www.lclark.edu/~iso/admit.html Staff members of this office can answer questions about Lewis & Clark academic and campus life programs, the admission process, immigration, or any other topics relevant to an international student's planning.

First-Year Student Application Checklist
To have your application file considered, you must submit the following materials according to the schedule of your preferred application option described above.

Submit Electronically -
*Application with essay.
*$45 application fee (*Please note: students requesting a waiver of the application fee should contact the Office of Admissions for a hard copy of the admissions application, or download a copy from our Web Site. CollegeNet will not process your application if the fee has not been submitted.)

Print Forms and Submit -
* Counselor's Report form.
* Teacher's Recommendation form, completed by the teacher of an academic course (English, mathematics, science, foreign language, history, or social studies) taken in your junior or senior year. If you have chosen the Portfolio Path admission program, three academic teacher recommendations are required. Please duplicate the form provided.

Request From High School or Testing Agency -
* Official high school transcript.
Early Action (December 1) candidates must submit a transcript including grades from 9th through 11th grade and a complete list of courses in which they are enrolled during their senior year.
Regular Decision (February 1) candidates must submit the same as above plus grades from the first marking period of the senior year (A copy of your report card is acceptable).
* Seventh-semester transcript. All first-year applicants must submit this for review by the Admissions Committee as soon as it is available.
* SAT I and/or ACT scores. These are considered official if reported on the high school transcript. Students applying via the Portfolio Path may choose to have their counselors remove the scores from their records before submission to Lewis & Clark.

Transfer Application Checklist
To have your application file considered, you must submit the following materials according to the schedule of your preferred application option described above:

Submit Electronically -
* Application with essay.
* $45 application fee. (*Please note: students requesting a waiver of the application fee should contact the Office of Admissions for a hard copy of the admissions application, or download a copy from our Web Site. CollegeNet will not process your application if the fee has not been submitted.)
* Letter explaining your reasons for wanting to transfer to Lewis & Clark at this time.

Additional Required Credentials -
* Official college transcript(s) from each college or university attended.
* Official high school transcript showing graduation (required of all transfer applicants).
* SAT I and/or ACT scores (on a secondary school transcript or from the testing agency) unless you will have completed 60 semester (95 quarter) credits of transferable course work prior to enrollment at Lewis & Clark. Students applying via the Portfolio Path are not required to submit these scores.
* Teacher's Recommendation form to be completed by a college professor. If you have chosen the Portfolio Path admission program, three teacher recommendations are required. Please duplicate the form provided.
* Dean of Students form. We will mail you this form when we receive your application.

First-Year and Transfer Students Applying for Need-Based Financial Aid

All applicants for financial aid must submit the Free Application for Federal Student Aid (FAFSA) to the federal processing center. The FAFSA is available in your college counseling office in November. You can also access the FAFSA through the Web at www.ed.gov/offices/OPE/express.html. Please note that the results of the FAFSA must be received in the Office of Student Financial Services by March 1, 1999, to receive priority consideration. This means that the FAFSA should be filed with the federal processor by February 1, to allow for three to four weeks' processing time. Students may file after this date, but late applications will be reviewed subject to availability of funds. Transfer students who have taken college courses prior to applying to Lewis & Clark must contact the financial aid office at each college or university attended and request that a Financial Aid Transcript be sent to:

Office of Student Financial Services
Lewis & Clark College
0615 S.W. Palatine Hill Road
Portland, Oregon 97219-7899

This form is required whether or not you received financial aid at that institution.

Lewis & Clark's Title IV (FAFSA) code number is 003197.

Admissions Essay

The essay helps us get acquainted with you in ways different from courses, grades, test scores, and other objective data. It also enables you to demonstrate your ability to organize thoughts and express yourself. This is a very important part of the admission process.

In not more than one thousand words, please write an essay about one of the following topics listed below.
1) Describe a significant person or experience that has had a profound effect on your life, and describe that effect.
2) Discuss some issue of local, national, or international concern and its importance to you.
3) Describe a specific situation or experience that led you to question your values or change one of your strongly held opinions. How did you change as a result of the experience?
4) What character in a book you've read can you relate to best? How do you see yourself in this character?

Transfer applicants: You must also write a letter on your reasons for wanting to transfer to Lewis & Clark College at this time.

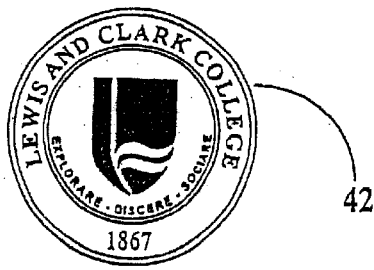
42

Lewis & Clark College
Application for Admission, Page 2
Fee: $45.00

---

Office of Admissions
0615 S.W. Palatine Hill Road
Portland, Oregon 97219-7899
Phone: 503-768-7040

Toll-Free: 800-444-4111
Fax: 503-768-7055
Internet: admissions@lclark.edu
World Wide Web: http://www.lclark.edu

---

Admissions Plan:
   Early Decision (binding)
   Early Action (nonbinding)
   Regular decision Applicant status:
   First-year student
   Transfer student
   Portfolio Path?   Yes   No Residence Plans:
   Residence hall
   Commuting student Entry date: [ ]

Personal

Last/Family Name: [ ]   First: [ ]
Middle: [ ]   Gender:  Male  Female
Preferred name or nickname: [ ]   Former last name(s), if any [ ]

Permanent address: [ ]
Street: [ ]   Box/Apt: [ ]

City: [ ]   State/Province: [ ]

Zip/Postal Code: [ ]   Current telephone (area code) + number [ ]

E-mail address: [ ]   Fax#: [ ]

If different from above, please give your mailing address for all admissions correspondence:
Street: [ ]   Box/Apt: [ ]

City: [ ]   State/Province: [ ]

Zip/Postal code: [ ]   Phone at mailing address: [ ]

Social Security #: [        ]   Date of birth (MMDDYY): [  ][  ][  ]

What country are you a citizen of? (view codes) [  ]

Religious affiliation (optional) [        ]

If not a U.S. citizen, are you a Permanent Resident?   Yes   No   Visa type [        ]

Have you previously applied to Lewis & Clark?   Yes   No.

If yes, for which term/year? [        ]

Will you be a candidate for need-based financial aid?   Yes   No
(Financial aid is not a factor in the admission decision process. Indicating "yes" will allow us to send the required IDF packet.)

If yes, FASFA and IDF forms were/will be filed on: [  ][  ][  ]

(See application instructions for important deadline information.)

Name of your current school: [        ]

Type of School: [        ]

For first-year students only:
Name of high school counselor: [        ]

Office telephone: [        ]   School Fax #: [        ]

High School CEEB code number: [        ]

If you're not currently attending school, please tell us what you're doing.

96
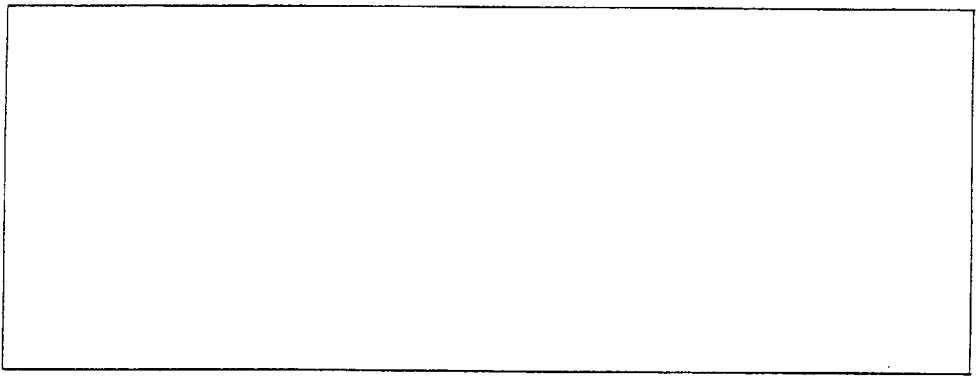
Please list any relatives who may have attended Lewis & Clark, give their name, relationship, class (if known).
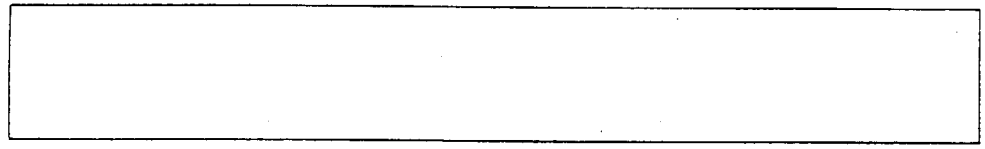
What influenced you to apply to Lewis & Clark?
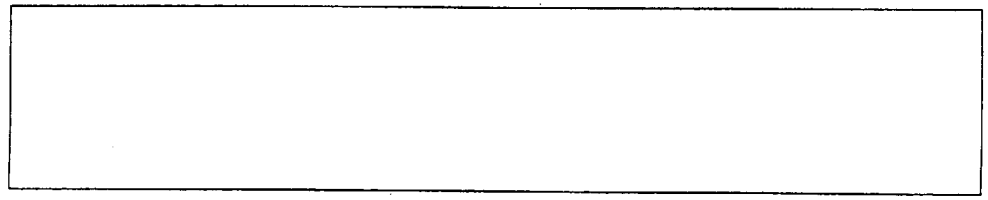
Have you ever visited the Lewis & Clark campus?   Yes    No   If yes, when? (MMDDYY)
| Save and | 2 | 3 | 4 | Page 1 | | Save this Page | |
FIG. 9c 96 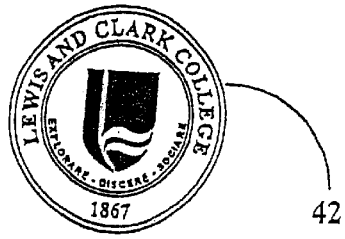

*Lewis & Clark College
Application for Admission, Page 2
Fee: $45.00*

Education

Please list all the secondary schools including summer schools, programs, and institutes you have attended, grades 9-12, most recent first.

| Name of School | City | State | Date Begin (MMYY) | Date End (MMYY) |
|---|---|---|---|---|
|  |  |  |  |  |
|  |  |  |  |  |
|  |  |  |  |  |

Please list all colleges and universities you have attended, most recent first. Please have an official transcript sent from each institution.

| Name of School | City, State | Quarter or Semester system | Date Begin (MMYY) | Date end (MMYY) |
|---|---|---|---|---|
|  |  |  |  |  |
|  |  |  |  |  |
|  |  |  |  |  |

Academic Interests

Areas of study We realize this may change as you progress through college. Please indicate first and second choice of possible interest areas. If you have more than two, please indicate an undecided area.

First Choice [                              ]

Second Choice [                              ]

Overseas/Off Campus If more than one, please indicate first and second choices.
First Choice:
    No interest     Australia/New Zealand     Africa     Washington, D.C.     East Asia
    South/Southeast Asia     Eastern Europe/Russia and the Republics     New York City
    Southern/Central America     Western Europe

FIG. 10a

Second Choice
- No interest
- South/Southeast Asia
- Southern/Central America
- Australia/New Zealand
- Eastern Europe/Russia and the Republics
- Western Europe
- Africa
- Washington, D.C.
- East Asia
- New York City Curricular Interest Activities Please choose any of the following activities offered at Lewis & Clark in which you plan to participate.

Forensics

☐ debate, oratory, extemp, oral interpretation, or impromptu

Media

☐ Literary Review

☐ Meridian cross-cultural journal

☐ Pioneer Log newspaper

☐ KLC radio station

☐ Yiem Kimtah yearbook

☐ LCTV video and film group

Music

☐ choral groups, chamber music, keyboards, orchestra, and jazz, wind, string, or brass ensemble Student activities ☐ admissions volunteer ☐ College Outdoors ☐ community service ☐ intramurals ☐ peer tutoring ☐ student government Theatre ☐ acting, dance, directing, lightening, set design, tech Varsity Sports ☐ baseball ☐ basketball ☐ cross country ☐ Football ☐ golf ☐ softball ☐ swimming ☐ tennis ☐ track and field ☐ volleyball (women)

Club Sports

FIG. 10b

☐ crew
☐ lacrosse
☐ martial arts
☐ rugby
☐ sailing
☐ skiing
☐ soccer
☐ volleyball (men)

| Save and | 1 | 3 | 4 | | Page 2 | | Save this Page | |

FIG. 10c

*Lewis & Clark College*
*Application for Admission, page 3*
*Fee: $45.00*

Family Information

Father Last/Family Name: [_____] First: [_____]

Street: [_____] City: [_____]

State/Province: [__] Zip/Postal Code: [_____] Living: Yes No

Occupation/Title: [_____] Employer: [_____]

Daytime phone: [_____]

College(s): [_____] Degree(s) Earned: [_____]

Grad Year: [_____]

Professional or graduate school: [_____] Grad Year: 19[__]

Degree(s) Earned: [_____]

Mother Last/Family Name: [_____] First: [_____]

Maiden Name: [_____]

Street: [_____] City: [_____]

State/Province: [__] Zip/Postal Code: [_____] Living: Yes No

Occupation/Title: [_____] Employer: [_____]

Daytime phone: [_____]

College(s): [_____] Degree(s) Earned: [_____]

Grad Year: [_____]

Professional or graduate school: [_____] Grad Year: 19[__]

Degree(s) Earned: [_____]

Are your parents: Married  Separated   Divorced   Widowed
If not with both parents, with whom do you make your permanent home? (Name and relationship)
[_____]

Please give names and ages of your brothers and sisters. If they have attended college, give the names of the institutions attended, degrees, and approximate dates:

FIG 11a

The following items are optional:
Birthplace (City, State, Country) [view codes]: ☐
☐ , ☐
Martial Status: ☐
Father's Birthplace (City, State, Country) [view codes]:
☐
Mother's Birthplace(City, State, Country) [view codes]:
☐
What is your first language, if other than English? ☐
How would you describe yourself?
Ethnic Origin: ☐

Scholastic Information

Please indicate your test plans and results below. Be sure to have test scores sent by the testing agency or your secondary school as soon as they are available.

SAT I

| Test date (MMYY) | | Verbal | Math |
|---|---|---|---|
| | | | |
| | | | |

Next date to be taken ☐ ☐ ☐

ACT

| Test Date (MMYY) | Composite |
|---|---|
| | |
| | |

Next date to be taken ☐ ☐ ☐

Save and go to page ☐1☐ ☐2☐ ☐4☐  Page 3    Save this Page ☐

FIG 11b

Lewis & Clark College
Application for Admission, page 3
Fee: $45.00

Briefly describe any academic distinctions or honors you have won in grades 9-12, or while in college.

Extracurricular and Personal Activities. Please list your principal extracurricular, community, and individual activities in order of their interest to you, most important first.

| Activity | Type | School years or Post-secondary (PS) | | | | | Approximate time spent | | Positions held, honors won, or letters earned | Do you plan to participate in college? |
|---|---|---|---|---|---|---|---|---|---|---|
| | | 9 | 10 | 11 | 12 | PS | Hours per week | Weeks per year | | |
| | | | | | | | | | | Yes No |
| | | | | | | | | | | Yes No |
| | | | | | | | | | | Yes No |
| | | | | | | | | | | Yes No |
| | | | | | | | | | | Yes No |
| | | | | | | | | | | Yes No |
| | | | | | | | | | | Yes No |
| | | | | | | | | | | Yes No |

Please list any study, travel, work, volunteer, or other experience you have had in the past three years, most recent first.

| Specific nature of experience | Location | Begin dates (MMYY) | End dates (MMYY) | # hours spent per week |
|---|---|---|---|---|
| | | | | |
| | | | | |
| | | | | |
| | | | | |

In space below, briefly discuss which one of your activities (extracurricular, personal, or work experience) has had the most meaning for you, and why.

FIG 12b

Essay/Personal Statement

The essay helps us become acquainted with you in ways different from courses, grades test scores, and other objective data. It also enables you to demonstrate your ability to organize your thoughts and express yourself. This is a very important part of the admission process and we encourage you to respond thoughtfully.

Please write an essay about one of the following topics listed below.

1) Describe a significant person or experience that has had a profound effect on your life, and describe that effect.
2) Discuss some issue of local, national, or international concern and its importance to you.
3) What living person would you most like to invite to dinner and why? What would you talk about?
4) What character in a book you've read can you relate to best? How do you see yourself in this character?

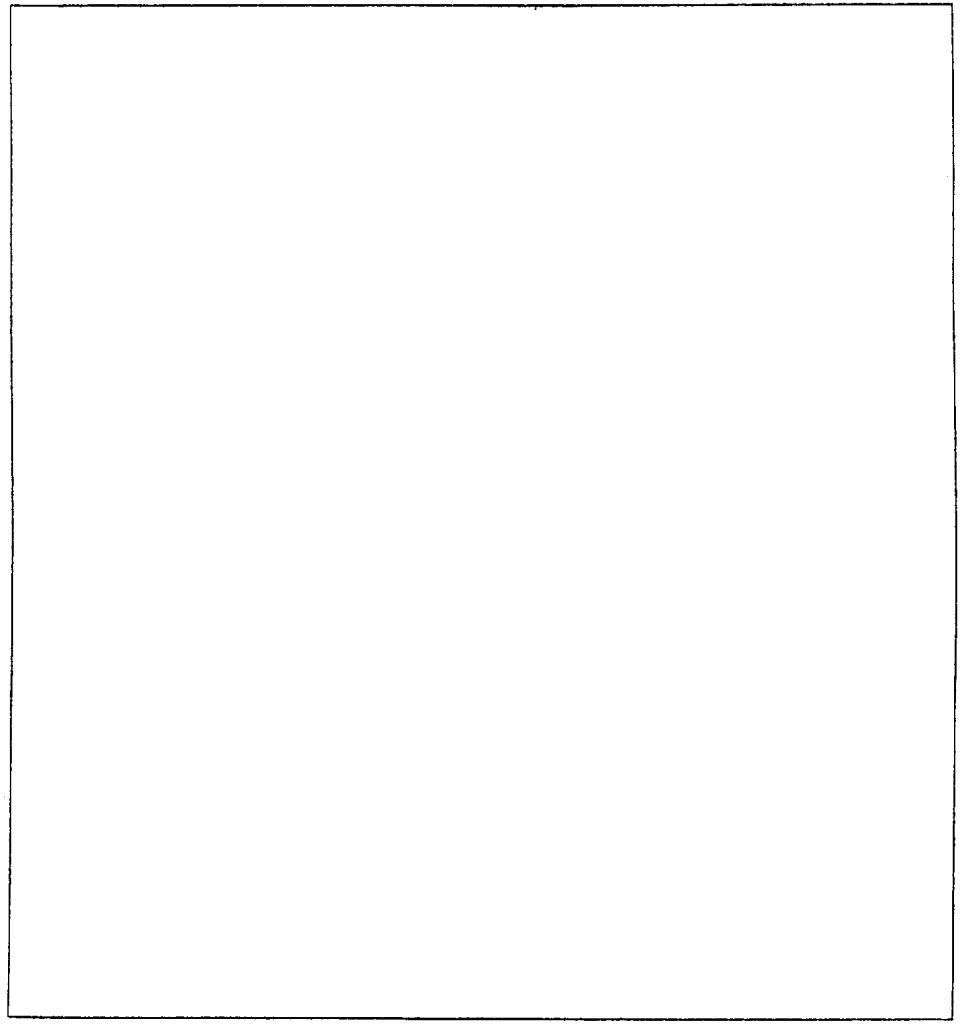

*Transfer applicants:* You must also write a letter on your reasons for wanting to transfer to Lewis & Clark College at this time.

FIG 12c

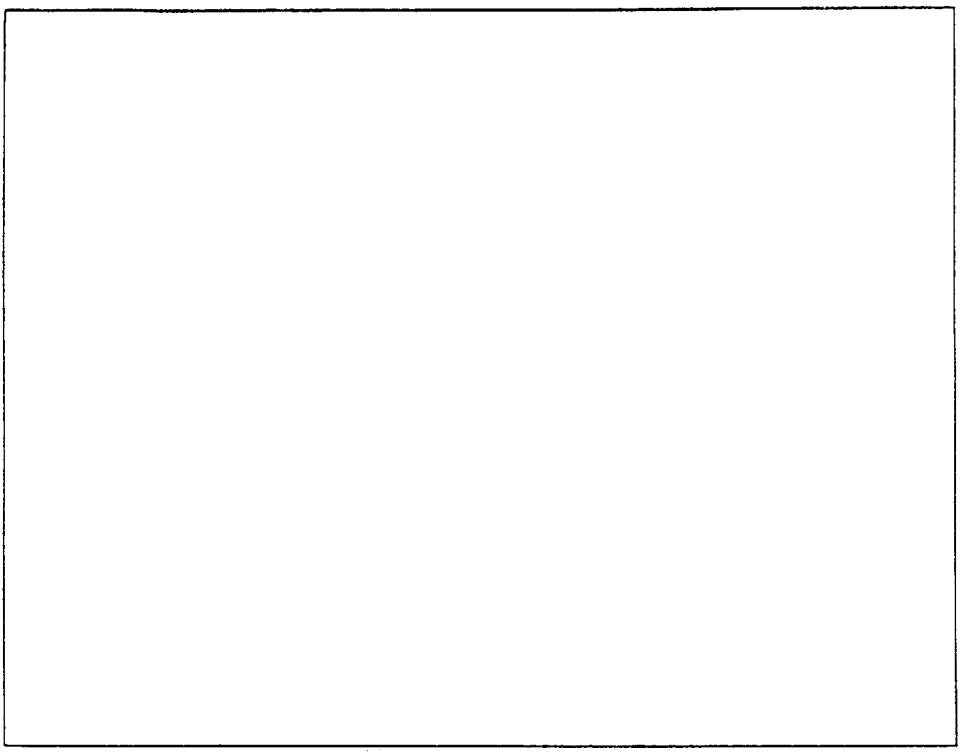

By checking 'Yes' below indicates that all the information I submit for my application is complete, factually correct, and honestly presented.

Yes    No       Date: (MMDDYY) ☐ ☐ ☐

Lewis & Clark adheres to a nondiscriminatory policy with respect to employment, enrollment, and program. The College does not discriminate on the basis of race, color, creed, sex, national origin, age, handicap, or disability, sexual orientation, or martial status and has a firm commitment to promote the letter and spirit of all equal opportunity and civil rights laws.

| Save and go to page | 1 | 2 | 3 | Page 4 | | Save this Page | |

FIG 12d

UNIVERSAL FORMS ENGINE

RELATED APPLICATIONS

This application claims priority for U.S. Provisional Patent application No. 60/088,123, filed Jun. 4, 1998.

FIELD OF THE INVENTION

This invention relates to a computer implemented method and apparatus for processing forms and, in particular, to a method and apparatus for processing customizable application forms that share information from an extensible database.

BACKGROUND OF THE INVENTION

The processing of college admission application forms described below is illustrative of the current state of forms processing. Students applying to colleges and universities typically complete a separate paper application for each institution to which they seek admission. Each application is then mailed to the corresponding institution along with an application fee.

Many institutions would like to simplify the application process by allowing students to apply over the Internet. Although an Internet application allows an institution to process the application information electronically, a student is required to re-enter the same information for each subsequent application to a different institution or to the same institution for a different academic term. Moreover, if the institution wishes to change the application form, the institution must typically revise the source code that creates the application form, thereby making changes to the application form expensive and inconvenient.

One could reduce redundancy in the application process by allowing students to complete a single, generic application provided by a third party who would then transmit the application to any designated institution. Such systems, however, would make it impossible for institutions to customize their applications form. In an environment where schools are competing for top students, the image that a school projects to potential students is important, and a customized application can help project the image that the school wishes to create. The questions that a school asks on its application reflect the values of the institution. Many schools want information different from that which would be on a generic form. Thus, it is unacceptable to many institutions to use a generic application form.

Most institutions continue, therefore, to use primarily paper applications or their own on-line applications, with the disadvantages described above. Moreover, the institution must then process the application fee for on-line applications, which may require that the institution have some expertise in electronic commerce.

SUMMARY OF THE INVENTION

Accordingly, it is an object of the present invention to provide an improved method of processing forms.

It is yet another object of the present invention to provide such a method that allows data sharing between customizable forms, the customization including branding of forms to specific institutions.

It is yet a further object of the invention to provide such a method that uses an extensible data-sharing database.

It is still another object of the present invention to provide an improved method of processing admissions applications.

The present invention comprises a universal forms engine that permits the creation and processing of customizable electronic forms and selective sharing of information between the customized forms. A user thus enters data only once, and the data is shared through an extensible database between disparate forms. The forms are completed by a user over a computer network and information from each completed form is forwarded to the appropriate entity over a computer network. The ability of the forms engine to present a form for user input, to receive data from the user, and to provide the data to the appropriate entity is independent of the computing platform of the user and the entity. Any fees associated with the forms can be processed electronically over a computer network together with the forms.

The invention thus creates forms, parses data on forms, stores data, retrieves the data, and deploys the data onto other forms. As additional forms are completed and additional information becomes part of the database, the amount of information that must be manually entered on new forms decreases because the new forms are automatically populated with the previously entered data.

A form is considered to be essentially a container for data and implies an associated process. The forms engine integrates the form, the data, and the processing regardless of the appearance of the form, the type or significance of the data, and the processing that follows collection of the data.

Metadata, that is, information that characterizes the applicant data is also stored. For example, in one embodiment, an attribute table describes characteristics, such as permissible values and accessibility to various institution personnel, of applicant attribute data. In another embodiment, such properties of the applicant attributes are stored in XML files. Storing metadata provides greater control over the data validation, sharing between forms, grouping, and access.

User information and application information are abstracted from the coding, that is, the user information and application information is stored in a way that allows the application information and the user information to be changed without reprogramming. This abstraction allows the set of user data to be extended without reprogramming, allows the user data to be displayed in different formats in different applications, allows the data to be validated to ensure that it can be used by the institutions, and eases access to the information over the Web by institutions. Abstracting the application information allows the application itself to readily changed, and allows changes, such as changes to application dates, to be made by the institutions themselves. The abstracted information is saved, for example, in a relational database or in an XML file.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3 shows a web page showing the results of an on-line college search that provided the link to the entry web page of FIG. 2.

FIG. 4 shows a web page for creating a new account with the servicer of FIG. 1.

FIGS. 6a–6d show a web page used to supply directions and information to the applicant of FIG. 1.

FIGS. 8a–8d shows an application instruction page for an on-line application.

FIGS. 9a–9c shows the first page of an on-line admissions application

FIGS. 10a–10c shows the second page of an on-line admissions application

FIGS. 11a and 11b shows the third page of an on-line admissions application.

FIGS. 12a–12d shows the fourth page of an on-line admissions application.

DETAILED DESCRIPTION

The system according to a preferred embodiment of the present invention comprises a forms engine that processes applications for admission to institutions. The preferred embodiment, which is operated by a third party application servicer, uses relational databases for storing information and communicates with applicants and institutions over the World Wide Web. The invention is not limited, however, to the processing of any particular type of form or to the use of any particular network or database.

Overview of a Preferred Embodiment

Figure 1:
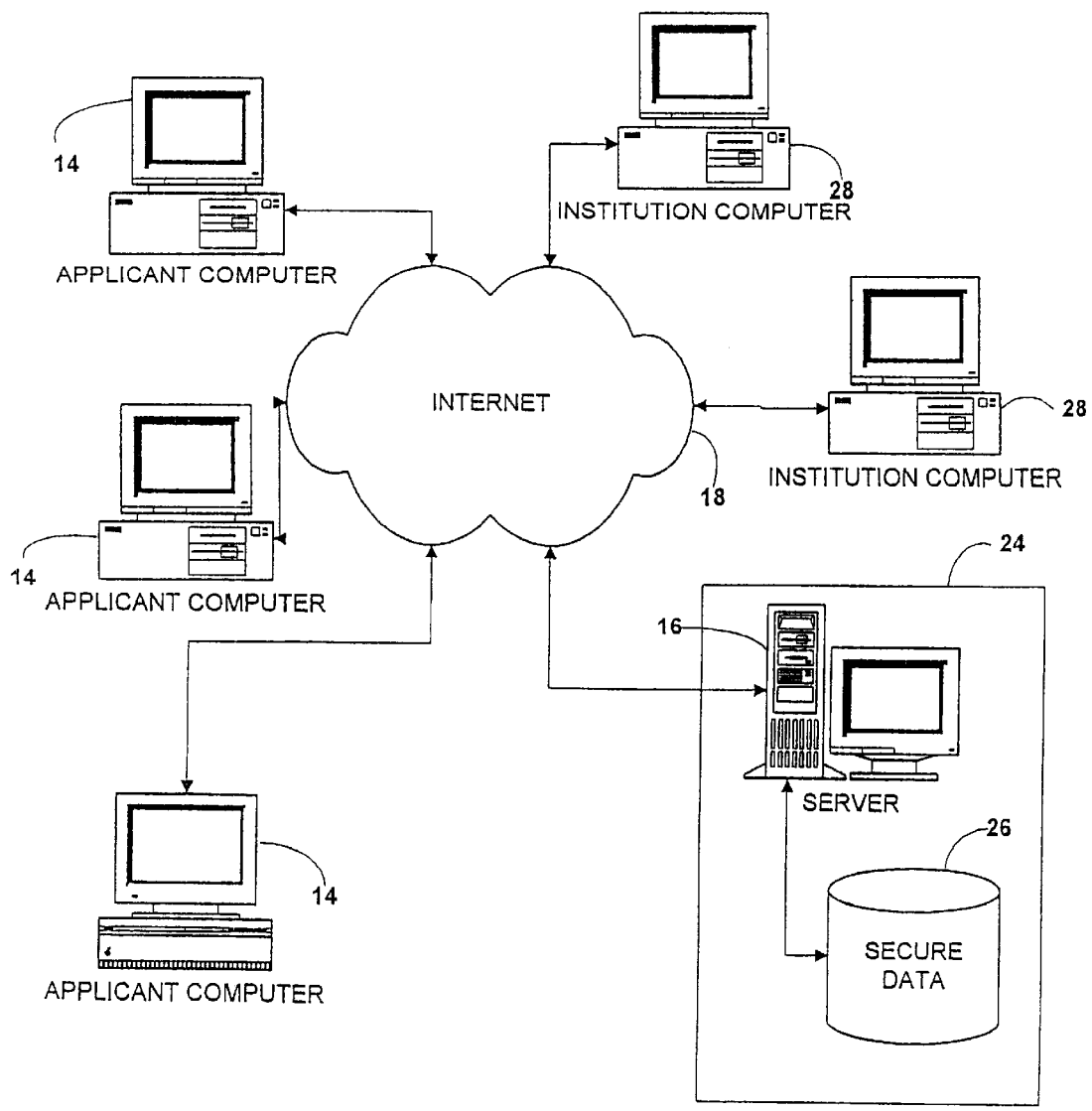
FIG. 1 shows a network through which applicants, a servicer, and institutions are connected in a preferred embodiment of the invention

FIG. 1 shows multiple applicant computers 14 that communicate with a server 16 through the portion of the Internet 18 known as the World Wide Web (the Web). A typical applicant computer 14 comprises a personal computer, such as a Pentium-based personal computer using a Windows-based operating system and running a commercially available Web Browser, such as Netscape Navigator or Internet Explorer. In a preferred embodiment, applicant computers 14 can use an older, text-based browser, because processing, such as error checking, is performed at server 16, rather than at the client browser.

Server 16 is a computer, such as a Sun Solaris UltraSparc Server, that is executing a forms engine of the present invention, as well as Web server software that coordinates communications with visitors to the form engine Web site. Information and forms transferred from server 16 are typically formatted in a hypertext mark-up language (HTML) and can include text, programs, graphics, video, and audio portions. Server 16 is preferably operated by a third party application servicer 24 and is connected to secure data storage 26. Multiple institution computer 28, operated by institutions, such as colleges or universities that require admissions applications, also communicates with server 16 over the Internet 18.

Although the preferred embodiment of the invention is implemented using an Internet Web site, the invention is not limited to any particular type of computer or computer network. By making the applications available over the Web, any applicant with a Web browser can apply electronically. On-line application also allows the application fee to be processed on-line, so that credit card settlements, electronic bank withdrawals, and other payment methods can be performed more efficiently, and the settlement can be easily facilitated by the third party that operates the application forms engine to which multiple institutions subscribe.

Figure 2:
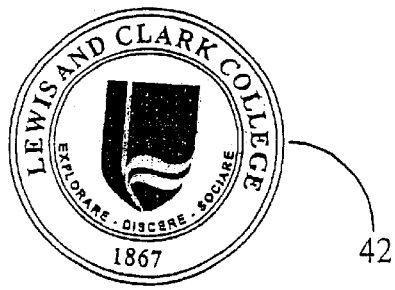
FIG. 2 shows an entry web page presented to an applicant of FIG. 1.

FIG. 2 shows an entry page 36 that is presented to an applicant who has accessed server 16 of FIG. 1. In a preferred embodiment, entry page 36, as well as all other pages presented to the applicant, is presented as an HTML page. Pages on which the applicant enters information use the HTML <FORM> tag. The HTML form posts information to server 16, which executes a common gateway interface (CGI) program specified by the form to process the received information. The CGI program is preferably written in Perl, C, C++, Java, or another language that supports CGI. The CGI program accesses a database that includes information about the customized application form and about the applicant. The database is preferably a relational database that is accessed using a structured query language through a database management system, such as Informix®, by Informix Software, Inc., based in Menlo Park, Calif. The invention is not limited to a particular implementation technology. The implementation details of the invention are expected to change as computer technology evolves.

Entry page 36 can be accessed from, and can be in the same style as, an institution's own world wide web site. Entry page 36 can also be accessed from other links, for example, by a link 38 (FIG. 3) on a results web page 40 from an on-line college search, such as the CollegeNET™ System, operated by the assignee of the present invention. Entry page 36 is branded with a logotype 42 branding the application as belonging to the institution to which it is directed, although the application is preferably hosted by a third party to ease data sharing across institutions and electronic processing of application fees.

Before accessing an application from entry page 36, each applicant is required to have an account with the third party servicer 24. Entry page 36 includes a link 52 for creating a new account. FIG. 4 shows a web page form 54 that is presented to the applicant to create a new account. Although the account is with third party servicer 24 and can be used to apply to many institutions, web page form 54 is branded with the logotype 42 of the institution to which the applicant is applying. Thus, it is transparent to the applicant that the application is being processed by third party servicer 24.

Figure 5:
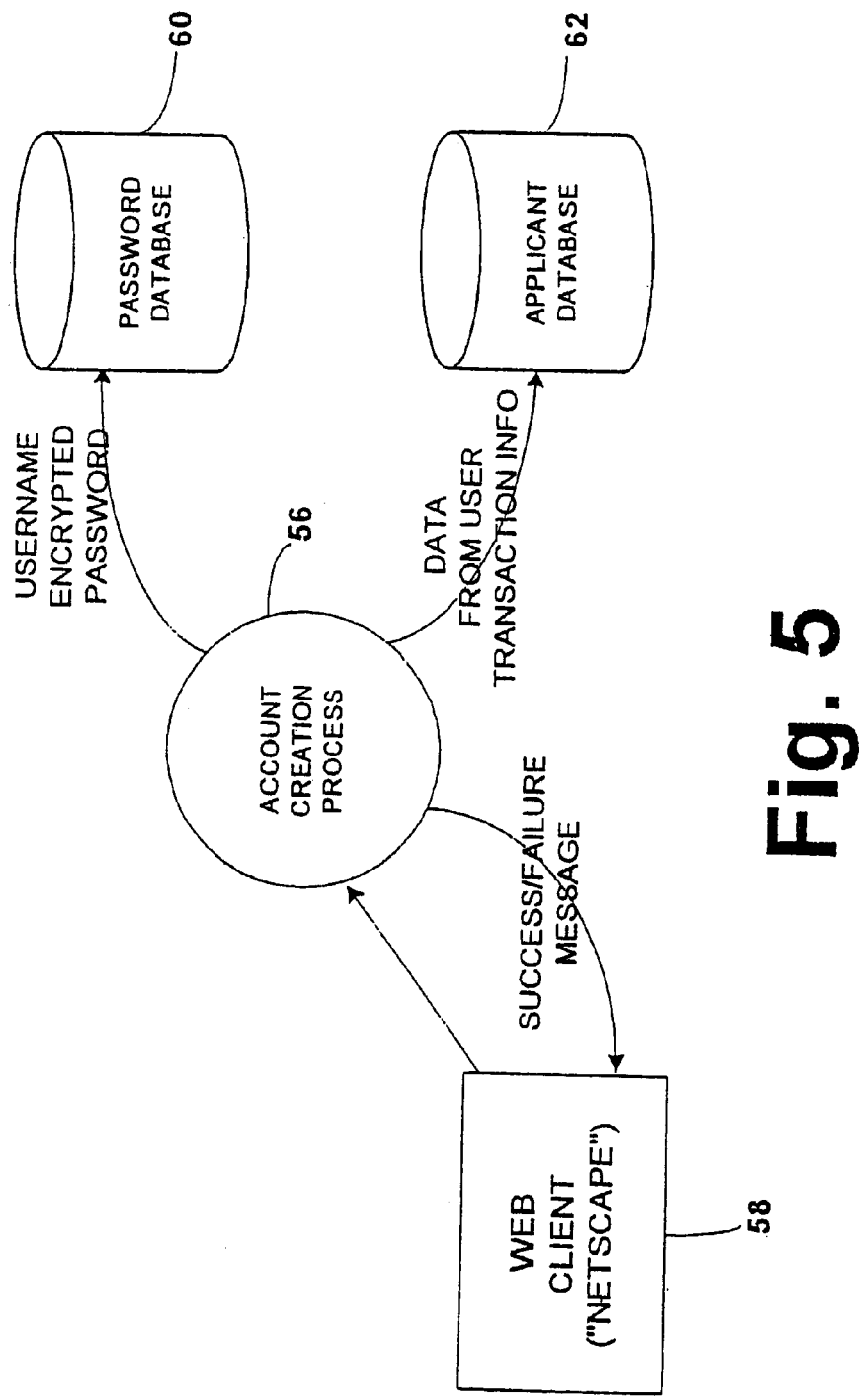
FIG. 5 is a diagram showing schematically how accounts are created in a preferred embodiment of the present invention.

FIG. 5 shows schematically the actions that comprise the account creation process 56 required to create an account. The applicant uses a web client 58, such as Netscape Navigator, to enter personal information, such as name, address, e-mail address, and a user name and password for accessing the system. The password is encrypted and saved, along with the user name, in a password database 60 connected with server 16 (FIG. 1) and user information is saved in an applicant database 62, which databases comprise database 26.

Entry page 36 (FIG. 2) also provides an information link 68 to provide the application with directions and information. FIGS. 6a–6d show a preferred information web page 70 that is returned to the user in response to a request for information. Web page 70 is also branded with logotype 42 indicating the institution to which the application is directed. Web page 70 includes an application option page link 72 (FIG. 6d) to the actual application, as does entry page 36. Entry page also includes a link 74 to the user's personal log page. The personal log describes the status of all applications the user has worked on, including applications that have been submitted and applications that are in various stages of completion. Entry page 36 also includes a link 76 for changing a user's password.

Figure 7:
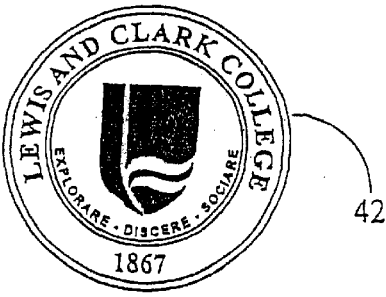
FIG. 7 shows an applications options page that provides the applicant with links to an application instruction page.
Figure 12A:
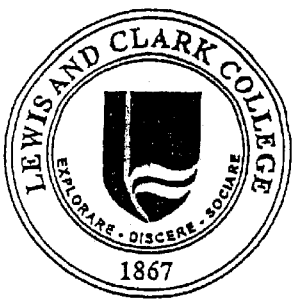

FIG. 7 shows an applications options page 82 that provides an application instruction page link 84, an application link 86, and links 92 to supplemental forms, such as a counselor's report or teacher recommendation forms, that accompany an application. FIGS. 8a–8d shows application instructions 94 reached from application link 86.

FIGS. 9a–9c show the first page of an electronic, on-line admissions application 96 that is customized in content and appearance for a particular institution. As shown in FIG. 9a, each application is individually "branded," that is, it carries the name and logotype 42 of the institution and appears in a style that is representative of the institution. Thus, it is transparent to the applicant that a third party is servicing the application, that is, the applicant may not even be aware that the application is processed by a third party servicer. In accordance with the invention, the third party servicer provides customized forms for each participating institution, and data is shared between the customized applications. Information that had previously been entered in connection with prior applications to any institution is automatically inserted into the customized form. Information entered by the applicant onto the application form is stored in an applicant database for automatic insertion into subsequent applications by that applicant. The HTML source code for page 1 is attached in Appendix 1. FIGS. 10a–10c, FIGS. 11a–11b, and FIGS. 12a–12d show additional pages of application 96.

Figure 13:
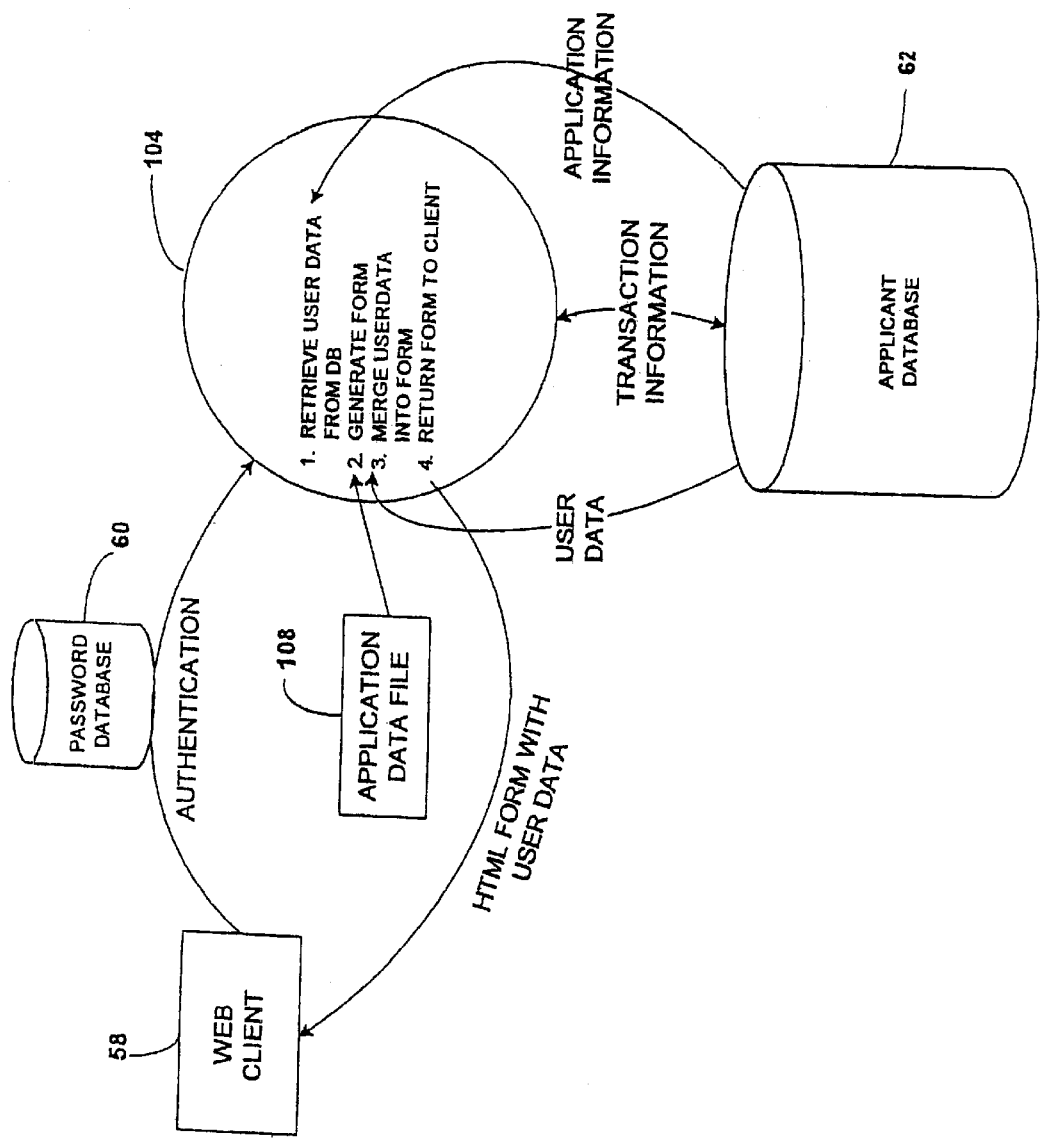
FIG. 13 is a diagram showing schematically the interactions between the applicant, the forms engine and the applicant database during initial access of an application form.

FIG. 13 shows schematically the interrelationship when supplying a form pages to an applicant between a forms engine 104 of the present invention, applicant database 62, password database 60, and web browser client 58 running on applicant computer 14. FIG. 13 shows that forms engine 104, preferably implemented as a CGI program, performs four primary functions. When the applicant requests an application form for a particular institution and the request is authenticated by comparing the password with the password in the password database 60, forms engine 104 retrieves user information regarding the status of applications that are pending or completed.

Forms engine 104 then generates a customized application form based upon an application description in an application data file 108. Forms engine 104 then retrieves user data that was entered in previous applications and stored in the applicant database 62, and merges the user data into the current application, which is then returned to the applicant as an HTML form. The applicant then enters any requested information that was not automatically inserted from the database.

Application 96 includes fields for the applicant to enter the specific information the institution requests of its applicants. The information is requested in a format chosen by the institution. The style and content of the customized application expresses the values held by the institution. The customized content of each application allows the school to obtain specific information that it chooses to characterize its applicant pool, including factors that it believes may correlate with student success at the particular institution.

Figure 14:
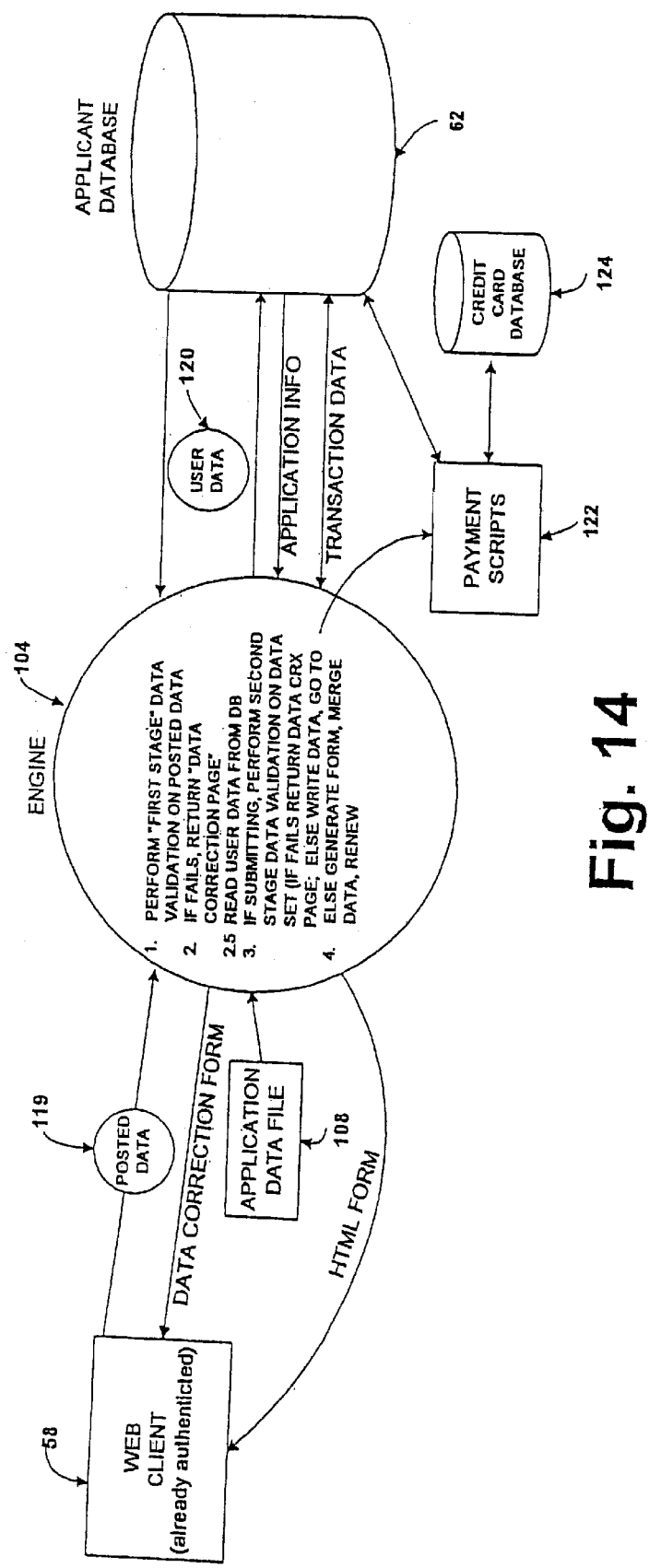
FIG. 14 is a diagram showing schematically the interactions between the applicant, the forms engine and the applicant database as data is posted from an application form.

FIG. 14 shows schematically the interactions between forms engine 104, applicant database 62, and web client 58 with respect to forms engine 104 receiving data posted from the applicant. Forms engine 104 performs a "frontend" validation on the posted data 118. Data validation is explained in detail below. If the data fail validation, a data correction page is sent to the applicant. If the data pass first stage validation, the next application page is prepared by merging applicant information from the applicant database 62 with form information in application data file 108 and sending the resulting HTML application page to the applicant.

After all the pages have passed first stage validation and the applicant attempts to submit the completed application to the institution, a second stage validation is performed. If the second stage validation is successful, user data 120 is written to the applicant database 62 and payment scripts 122 are executed in which the user is given an option to select any one of several of on-line payment methods. Credit card information is verified from a credit card database 124. After the information on the application is validated, it is transferred to the institution in a data format specified by the institution. The information is also stored for use in subsequent applications in an applicant database 62, which is independent of the institution.

Figure 15:
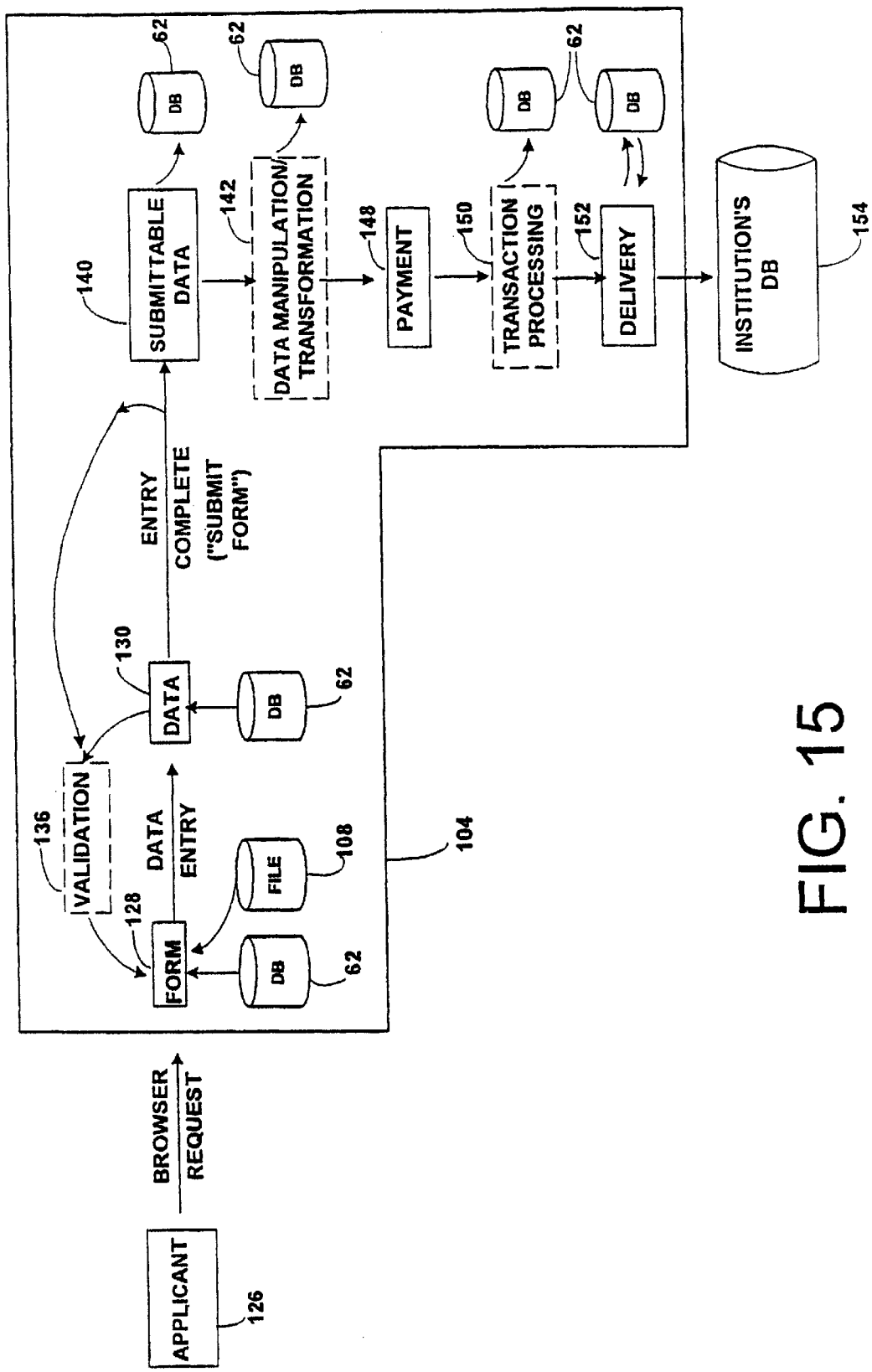
FIG. 15 shows a flowchart of the interactions shown in FIGS. 13 and 14.

FIG. 15 is a flowchart showing the products at each step of processing by forms engine 104 described in FIGS. 13 and 14. Optional steps are shown in dashed lines. FIG. 15 shows that an applicant 126 contacts forms engine 104 by a browser request for an application. Before presenting an application page to an applicant, forms engine 104 determines the state of the application process, and only presents appropriate pages to the applicant. For example, most institutions have application date windows during which applications, whether electronic or paper, for a particular term are accepted. The forms engine verifies that the application is being submitted within the allowed window. Unlike pre-printed paper applications, however, the invention provides the schools the flexibility of easily changing the application date window, so that the time to apply can be extended if the institution wants to receive additional applications.

Forms engine 104 uses data from the appropriate application data file 108 (FIG. 14) and previously entered user data to generate a page of a form 128. Data 130 is entered on the form page, by the applicant or from the database, and the page undergoes a first stage data validation 136 upon being posted by the applicant. A correction page form is submitted to the applicant each time a data validation fails, and the data is saved to the database upon successful validation. The process is repeated for additional pages until the form is completed and the applicant submits the form.

When the applicant indicates that the application is ready to be submitted to the institution, a final, more thorough validation 136, known as second stage validation, is performed on the data. Second stage validation ensures that information required by the specific institution to which the application is directed is present and that the information meets certain content criteria specified by the institution. The data validation is customized for each institution. If the application fails second stage validation, a data correction page is returned to the applicant. The validated, submittable data 140 is stored in applicant database 62 in connection with the application. The data is then processed and transformed 142 as described below in connection with aliases, and saved for use in other forms that the applicant may complete in the future. A payment 148 is then processed and application transaction processing 150 is completed. The forms engine then converts the application information into a form compatible with the institution's internal databases and delivers the information 152 to the institution's database 154.

When the applicant subsequently applies to a different institution or to a different program within the same institution, a new application, customized for the different institution, is presented to the applicant. Information that was entered onto previously submitted applications is retrieved from the database and presented to the applicant as populated fields of the new application, so that the applicant is not required to enter information more than once. The applicant can change the values in a pre-populated field if desired and the new values are saved for use in subsequent applications.

As described in more detail below, information about the applicants is maintained as a set of attributes, each attribute corresponding to database fields. If an institution chooses to include in its application a request for an applicant attribute that does not correspond to one included in the database, the database is easily extended to include the new applicant attributes without reprogramming the forms engine. Once the new attribute is added to the database, it is available for automatic inclusion in all subsequent applications.

In the preferred embodiment, each attribute used to characterize applicants has a unique identifier or alias. The unique identifier allows the engine to recognize when the same information is being described by different labels or entered in a different format on different application forms. The information can then be saved properly and inserted into subsequent applications, regardless of differences in the entry format and labels in the first and subsequent applications. Thus, the variables can be universal and unique data elements having different names can be shared among applications.

For example, one institution on its application may refer an applicants last name as a "family name" while another institution may refer to the last name as "surname" or a "last name," yet the forms engine would share the data properly between such application forms. As another example, if a first application form requests multiple choice-type information in the form of radio buttons and the second form requests the same information in the form of a pull-down menu, information entered on the first form in the radio buttons would appear in a pulldown menu box on the second form.

While providing the institution flexibility to designate and request the information any way it chooses on its customized application, the information is retrievable onto subsequent applications regardless of how the subsequent applications label or display the information. The forms engine of the present invention can thus share information across applications, regardless of how the information is expressed in a particular application, unless the data has been designated as described below as private to a particular application and not shareable.

Each applicant attribute is characterized by one or more properties. The properties that characterize an applicants' attributes can specify, for example, whether and under what conditions the attribute data can be shared between forms, whether the attribute is a universally required field, or whether the attribute is specific to a particular geographic region. For example, an attribute named "California Driver License Number" is applicable only to institutions in California. Other information may be applicable to all institutions within a region but not to other institutions. Some applicant attributes are applicable only to institutions in a particular school system. Individual pieces of information can also be grouped and properties can be specified for the groups. The application can also include information that designates the routing of the information to groups, such as financial aid officers, within the institution.

The invention not only allows an application to be customized for each institution, it allows the information submitted by the applicant to be transmitted to each institution in any data format that the institution requests so the institution is not required to convert the data to a useable format. For example, multiple fields, such as first name and last name, may be combined into a single field, and the data fields may be delimited by a delimiter specified by the institution. Data may also be transmitted to the institution, for example, as name-value pairs, as fixed records, in EDI, or printable PDF format. Thus, the applicant information is entered in a customizable form on a browser running on any type of computer platform and stored at third party servicer 24 in a database. The information in the database is then reloadable into another customizable application form for a different institution. The information is also transmittable to an institution in its preferred format regardless of the platform used by the institution to process the information.

After an application is sent to an institution, the information remains available in the database of the third party servicer for further analysis by the institution. The institution can, for example, sort or view applicants based upon attributes such as test scores, grade point average, participation in sports, or musical talent. Moreover, each applicant attribute has a property that can be used to specify who in the institution has access to the attribute for the purpose of uploading the information or of processing the information to characterize the applicant pool. For example, parts of an application dealing with academic background may be viewable by academic departments, whereas more personal information may be viewable only by school administrators.

A preferred implementation of the invention comprises a single forms engine program, a single applicant database, including information on all applicants, and one application data file for each different application of each the participating institutions. The application data file describes the format of each application, and the forms engine displays information from the database in the format prescribed by the application data file.

The applicant database can be extended to include new attributes without making any changes to the forms engine program or to the application files of institutions that chose not to include the new data. The forms engine automatically uses the application data file to produce the requested application in HTML format for display on the applicant's browser. The application description file can be easily modified, for example, to change labels or to add additional fields. The appearance of the application for each institution can be changed by changing its application description file, without reprogramming the forms engine. The completed application is transmitted to the institution with the data in any format that the institution prefers. The institution can therefore upload the data directly into its applicant or student information system database, merging the information seamlessly into their existing work flow, thereby avoiding the additional expense and errors of re-keyboarding the information. The forms engine thus has the capability of outputting application information universally across platforms.

A transactions database table and a transactions operations table track completed transactions and operations to assist the engine in maintaining information about the state of each application, so that only appropriate pages are presented to the applicant. These tables also allow the applicant to track the progress of his or her applications and online payment.

Database Structure

The tables described below are used in a preferred college admission forms processing system. The invention can be used for processing many different types of forms without departing from the scope of the invention, and skilled persons will recognize that different database structures will be required in different applications.

Attribute Table

A first database table, the Attribute Table, includes a list of all attributes that can be used to describe an applicant. The Attribute Table thus defines the variable space for the entire system. Each attribute, such as Name, Social Security Number, and SAT score, is represented by one row of the Attribute Table and is identified by a unique Attribute Identification Number. The Attribute Table includes properties of each attribute, such as whether the attribute is a required field for first stage validation (explained below) and whether the attribute is part of a data group, such as a geographical region or an institutional group. The Attribute Table also includes references to first stage validation rules, if any, for each attributes. The Attribute Table does not include values of the attribute for any particular applicant.

User Attribute Table

The values assigned to attributes for individual applicants are stored in a User Attributes Table. Each row of the table includes a User Identification, an Attribute Identification Number, a sequence for the Attribute Identification Number, and a data value. When an applicant enters information on an application page on the Web and posts the form to the server, the information entered by the applicant is stored in the User Attribute Table after first stage validation. The form is posted when the applicant switches to another page or when the applicant indicates that the information is to be saved. An applicant may change the values of an attribute from one application to another. For example, an applicant may change his or her SAT scores to reflect new test results.

The User Attribute Table always includes the latest information that an applicant had entered and is used to supply information for new applications. When the user calls up an application to complete, data is read from the User Attribute Table. When a new application includes attributes that were not requested by any application that the user previously completed, a new row corresponding to the new attribute is inserted into the User Attribute Table. Preferably a single User Attribute Table includes the attribute information on all applicants in the systems.

User Attribute Sent Table

After an application is completed and it passes second stage validation, the information contained in the application is stored in a User Attributes Sent Table, which represents a snapshot of the submitted application. The structure of the User Attribute Sent Table is very similar to that of the User Attribute Table. The primary key of the User Attribute Table is a user identifier (the users log-on name), whereas the primary key of the User Attribute Sent Table is a Transaction Identifier, which identifies a unique combination of user, application, and application term. Thus, there can be multiple records for a single user in the User Attribute Sent Table if the user has submitted multiple applications or the same application for different application terms.

The Transaction Identifier is the same identifier used in the Transactions Table, described below. Thus, one can scan the Transactions Table for Transaction Identifiers that correspond to applications that are shown as having been submitted, and then use those identifiers to look up data related to those applications in the User Attribute Sent table.

Second stage validation is performed before writing a record into the User Attribute Sent Table and may, for example, combine fields such as last name and first name into a single field. Thus, the User Attribute Sent table shows exactly what was sent to the institution, and therefore includes a record for each application that was completed by a user. To review what data was sent, the institution reviews information derived from the records in the User Attribute Sent Table, which are then put into a format requested by the institution.

Applications Table

Each customized application is represented within an Applications Table, which defines the data set for each application. Each row in the Applications Table pertains to one attribute in a specific application and includes information such as an Application Identification Number, Attribute Identification Number, Attribute Sequence Number within the application, any second stage validation rules (described below), the Identification Number of the institution to which the application belongs, etc.

Application Data File

The Application Data File is a specially formatted text file that acts as an application description. It is a series of "directives" and optional arguments which the forms engine parses to build the HTML form and to merge in user data. The directives are interpreted by means of a look-up in a data structure that stores the directive interpretations. For example, a line in the Application Data File may be "SS_NILM." Upon encountering the line, the forms engine will look into a data structure to interpret SS_NUM. SS_NUM may mean, for example, to display a text box with a label that reads "Enter Your Social Security Number" and to put the previously supplied value for social security number (stored in the User Attribute Table) into the text box. SS_NUM may also prescribe a minimum length, maximum length, and call a function that creates the text input box. The directive could also set flags that indicate a particular state for the application. The Application Data File can optionally supply arguments to directives. Arguments may, for example, instruct the forms engine to apply specific labels or to override default values, so that the label or format for entering the data can be customized. The information in the Application Data File could alternatively be included in the Applications Table.

In an alternative embodiment, rather than having the application information stored as directives and building the application whenever a student invokes it on-line, the application is built by a pre-processor utility that is run once to produce an "application template" with a regularized syntax. In other words, an Application Data File entry such as "SS_NUM" is replaced by a template line such as "SS_NUM|ITEXT|Social Security Number: |11|11 ".

In the previously described embodiment, the Application Data File lines represent function calls with optional arguments. The forms engine executes these function calls, which in turn execute a form-element-producing function like "ITEXT" which produces a text box. Thus, the forms engine not only needs to have available hundreds of functions, it also has to do two (or more) layers of function execution for each line in the Application Data File.

In the alternative embodiment, most of this processing is performed off-line during the application development phase, and the results of the processing is saved in the template file. The on-line forms engine then pulls in this "pre-digested" template file. Each line of the template file is a pipe ("|") separated list of: (1) variable name; (2) form element [for example, form element ITEXT is textbox, IRADIO is radio button(s), etc.]; (3) question label; and (4) arguments needed by the form element function.

Whereas the forms engine in the first embodiment is analogous to an interpreter, executing a shell script, the template in the second embodiment is analogous to compiled code. The pre-processing is analogous to a compilation phase, and the output template file is analogous to a binary object. It is composed of instructions to the engine, like compiled code is composed of instructions to the CPU, whereas the bulk of the forms engine in the first embodiment comprises code to do the interpretation, the forms engine in the second embodiment has a very small instruction set: basically one instruction per form element, plus a handful of special instructions.

The template file gives the application developer absolute freedom to quickly update the application with no need to rewrite or add program code to the forms engine. Use of templates also dramatically reduces the number of functions needed by the engine, as well as the execution overhead.

The template file can be in the form of specially tagged HTML; that is, instead of a line-by-line set of directives, the template can look like RTML with embedded special tags representing the form element/variable/value to interpolate.

Below is an example, simplified for clarity, of a part of a template represented in a specially tagged HTML:

```
<H1>Biographical Information</H1>
  <OL>
    <LI>
      <QUESTION ATTR_ID="53" ARGS="SS_NUM|ITEXT|11|11"
        VALRULE="Req();Int(- ,);Len(9)">Please enter
        your Social Security Number:
      </QUESTION>
    </LI>
    <LI>
      <QUESTION ATTR_ID="106" ARGS="BIRTH_DATE|DATEMDY"
        VALRULE="Req()">Please enter your birth date
        DYY:
      </QUESTION>
    </LI>
  </OL>
```

To process the template, the forms engine need only look for <QUESTION> ... </QUESTION> sections and parse them. Many other pieces of logic could also be embedded into the templates. The output of the processed template is an HTML form that is viewable by the student completing the application. The output from the above template snippet could look like this, with the special QUESTION tags converted into HTML form elements and user data incorporated:

```
<H1>Biographical Information</H1>
  <OL>
    <LI>
      Please enter your Social Security Number:
      <INPUT TYPE="TEXT" NAME="SS_NUM"
        VALUE="200-00-0000"  SIZE=11
        MAXLENGTH=11>
      </INPUT>
    </LI>
      Please enter your birth date (MMDDYY):
      <NOBR><INPUT TYPE="TEXT" NAME="mdy1_BIRTH_DATE"
        VALUE="09" SIZE=2 MAXLENGTH=2></INPUT>
      <INPUT TYPE="TEXT" NAME="mdy2_BIRTH_DATE"
        VALUE="17" SIZE=2 MAXLENGTH=2></INPUT>
      <INPUT TYPE="TEXT" NAME="mdy3_BIRTH_DATE"
        VALUE="1966" SIZE=4 MAXLENGTH=4></INPUT>
      </NOBR>
    </LI>
  </OL>
```

The above page is then transferred to the user.

Institutions Table

The Institutions Table includes a row for each institution. Each row includes an Institution Identifier, an Institution Name, an identifier for a parent institution if any, and other information about the institution.

Institutions can also be arranged in a hierarchy, with one institution belonging to another institution. The Institutions Table allows the construction of an arbitrary hierarchy of institutions, which can be used to control data access. Information in the Contact Table (described below) and Attribute Table is combined with information in the Institutions Table to determine access to particular attributes in applications. For example, a financial aid officer in the medical school of a university may have access only to financial information on the medical school application, whereas a financial aid officer of the university or of the university system may have access to financial information on all applications. Thus, the invention permits flexible control of data down to the attribute level.

Institutions can be grouped geographically or by other characteristics. The Institutions Table can have fields indicating to which groups the institution belongs. Thus, the forms engine can control attributes that are relevant only to institutions in a particular group.

Contact Table

The Contact Table specifies the database access privileges of people within an institution. For example, an administrator at a state university system may have access rights to data from applications to all universities within the system, whereas an administrator at a particular school may have access only to applications to that school.

Each row in the Contact Table includes a unique Contact Identifier, an Institutional Identifier, which defines the institution or group of institutions to which access is granted, and the operations which the contact is permitted. For example, a contact may be granted rights to acknowledge receipt of an application, to transfer application data using a file transfer protocol FTP), or to receive a printable, non-editable version of completed application.

The Contact Table can also contain additional useful information, such as the e-mail address or last log-in time for the contact.

Terms Table

The Terms Table indicates the application terms that are currently available. Each row of the Terms Table includes a unique Term Identifier, a Term Key, the start and expiration dates for applications to the institution for the term, a text description of the term, and an institution-defined Term Code. The institution-defined Term Code is used when data is uploaded to the institution so that the data is seamlessly loadable into the institution's information system. The Institution-Application Table described below defines the applications available for each institution and includes a term key field that identifies the terms for which the application can be used.

Institution-Application Table

One institution, represented by a row in the Institutions Table, can own several applications, each of which is represented by a row in the Institution-Application Table. For example, an institution may have one application for freshman undergraduate students, another for transfer undergraduate students, yet another for international students, etc.

The Institution-Application Table includes one row for each application owned by an institution and relates the information in the Applications Tables to the Institution described in the Institutions Table. Each row in the Institution-Application Table includes an Application Identifier, an Institution Identifier, status of the application, type of the application, and information pertinent to the particular application (i.e., name campus, etc.). Each row also includes a Term Key, which is used with the Term Table to determine which terms are currently available for applying using the application. The Institution-Application Table can also include information about the application processing fee and how the fee is allocated between the institution and the processor.

Transaction Operations Table

Each time an applicant performs an operation, such as saving a page of information, the operation is assigned a unique Operation Identification Number and a new row is added to the Transaction Operations Table. Each row of the Transaction Operations Table includes the unique Operation Identifier, a Transaction Identifier (described below with the Transaction Table), a code indicating which operation the row represents, a contact identifier, and a time stamp indicating the date and time of the operation. Operations include, for example, save, save and send, acknowledge, secure credit card, no fee, void, and view printable application.

The Transaction Operations Table and the Transaction Table described below are used to maintain state information.

Transaction Table

A Transactions Table includes information about each user transaction, that is, each application that a user has accessed and saved. Each entry in the Transaction Table includes a unique Transaction Identifier, a User Identifier, an Application Identifier, a Term Identifier, and a code indicating the state of the application. The Transaction Identifier represents a unique combination of User Identifier, Application Identifier, and Application Term. There is exactly one row in the Transaction Table for each Transaction Identifier. The application state can be, for example, 'in progress', 'submitted', 'payment received', and 'acknowledged by the institution,' etc. Each entry also includes an order identifier, a text string that includes the User Identifier, the Application Identifier and a time stamp. The Order Identifier is used for credit card settlement and in correspondence with the institution.

When a user accesses an application, the universal forms engine looks for an existing transaction involving the user and the requested application and term. If such a transaction exists, the response of the forms engine to the user depends upon the state of the transaction. If no such transaction exist, (i.e., this is the first access to this application by the user) a new transaction is begun. An new entry is inserted in the Transaction Table. A Transaction Identifier is assigned when the user requests an explicit save operation or a "save and send" operation for the new application. A Transaction Identifier is not assigned merely on the basis of a page flip on a multipage form.

Once the user selects the "Save, Pay and Send" button, the Term, Term Identifier and Order Identifier fields are populated, and the state is set to indicated the application has been submitted. Upon payment, a Payment Operation field is populated with the Operation Identifier for the payment operation, and the state is set to indicate that payment has been received. This continues as the transaction travels through settlement, acknowledgment, etc.

Applicant Pages

Applicant pages are those presented to the applicant. These include actual application pages generated by the forms engine and displayed with labels identifying the requested information and suitable form data entry elements for applicants to input the requested information. Applications are typically composed of multiple pages.

Another applicant page shows the applicant the status of all applications the applicant has worked on. This page is produced by a CGI utility that examines the tables described above and produces an HTML page showing whether each application has been completed, saved, submitted, or paid and whether it has been acknowledged by the school.

Correction pages are presented to the applicant when first or second stage validation described below detects missing or incorrect data.

Other pages include those that inform the user when no terms are available for accepting applications (that is, the current date is outside the submission windows) or when a requested application has already been submitted for the requested term.

Data Validation

The presence and content of the information is preferably checked at the server, rather than by the browser on the applicant's computer. This reduces the requirements for the browser, so that the applicant is not restricted to using the latest version of a browser and, as less computation is performed by the browser itself, compatibility problems are reduced. An applicant can use a character based browser, such as Lynx, if he chooses. When information is recalled from the database for insertion into a new application, it is checked against the content requirements of the institution. If the recalled data does not meet the criteria, the information is requested again from the applicant.

Data validation is performed in two stages. Data is saved both before and after each stage of validation. The first stage consists of checks that are universal to all applications. These checks are done every time a page is submitted, such as when a subsequent page is requested or when a page is saved. For example, first stage validation may check that the applicant's name is present, that SAT scores are between be 200–800, and that once the non-digit characters are stripped out of social security numbers, a sequence of nine digits not beginning with "9" or "000" remains.

To avoid presenting the applicant with an overwhelming number of fields that fail validation rules at the end of the entire application, it is preferable to validate as many fields as possible in the first stage validation. On the other hand, the number of required fields is preferably minimized in the first stage, because an applicant may want to partially complete an application during one session and complete the remaining fields at another time.

Second stage validation is performed when an application is being submitted to an institution and the entire form must be complete. The second stage typically includes more required fields and more specific validation rules for submitted data fields. Second stage validation is performed on the entire data set for the application and validates the information in accordance with rules specified by the institution for the particular application. First, institution specific required fields are verified. For example, because some institutions may be willing to process an application with the field Hobbies left blank, this field is not required in first stage validation. If an institution does require this field to be complete, an incomplete field will be flagged during second stage validation. After second stage validation is successfully completed, the data is ready to be uploaded to the institution.

The Application Table indicates which fields are required for the particular application. The Application Table also indicates certain data validation rules, such as permissible values or formats for data. The second stage validation can reformat the data into a format requested by the institution. For example, some institutions want the name of the applicant in the form of a single field, with the last name first, followed by a comma and then the first name and middle initial. To avoid having applicants enter data more than once to accommodate changes in format, the information is preferably stored in simpler data elements, and then combined during second stage validation into the format requested by the institution.

Dependency rules are checked during second stage validation. For example, whether a particular field, such as Alien Registration Number, is required may depend upon the value supplied by the applicant for another field, such as Citizenship.

A user who is earnestly filling out the application with the intent to submit it, could, upon submission, be confronted with many institution-required fields on a large second stage data correction page. To minimize the size of that page, the user is given the option of having first stage validation additionally scan the current page's fields for attributes which will be required by the second stage validation process.

Initially this option is active. If the user is presented a data correction page, the top of the page has radio buttons and instructions for enabling/disabling this feature. The user's choice is maintained between pages via a hidden field in the form(s).

In this manner, as the user progresses through the application, he can enter values for second stage-required fields in a gradual manner via the first stage validation process, rather than being confronted with many fields to populate upon submission.

If the user is unable to supply a value at the time, he can disable this feature and postpone entering data into the field until he is ready to submit the application to the institution.

Attribute Aliasing

Aliasing of attributes refers to a secondary naming scheme developed to create a flexible data dictionary. By using Aliasing, an application developer can rapidly locate attributes that are defined by system, and avoid creating duplicate attributes that store the same data.

Each attribute alias is a series of descriptors delimited by colons. For example, anything relating to address information uses a descriptor of "ADDRESS"; questions relating to the applicant's birth use a descriptor of "BIRTH".

Thus, the country of birth attribute is named "BIRTH_COUNTRY" but its alias is "BIRTH:ADDRESS:COUNTRY". Similarly, the date of birth attribute is named "BIRTH_DATE", and is aliased as "BIRTH:DATE".

Permanent address attributes are named "STREET", "STREET2", "CITY", "ZIP", etc. but the aliases are "ADDRESS:PERMANENT:CITY", "ADDRESS:PERMANENT:ZIP", etc.

Mailing address attributes are named "MAIL_STREET", "MAIL_STREET2", "MAIL_CITY", "MAIL_ZIP", etc. but the aliases are "ADDRESS:MAIL:CITY", "ADDRESS:MAIL:ZIP", etc.

The use of Aliasing provides the ability to search for content by a keyword or set of keywords. For example, to find "father's home address", one could search for all attributes whose aliases contain the descriptors "FATHER", "ADDRESS", and "HOME".

This search would locate the aliases "FATHER:ADDRESS:HOME.1:STREET", "FATHER:ADDRESS:HOME.1:CITY", "FATHER:ADDRESS:HOME.1:COUNTRY", "FATHER:ADDRESS:HOME.1:TELEPHONE", which correspond to the variable names "PERSON_AT_ADDRESS_SINCE.1", "PERSON_CITY.1", "PERSON_COUNTRY.1", "PERSON_PHONE.1", respectively.

One can look at the intersection or union of keyword search results to quickly access desired attributes.

Thus, the aliasing system is used primarily for developing new applications: not only as a lookup tool, but also to avoid adding as new variables attributes that already exist. Finally, aliasing ensures maximum data-sharing by weeding out duplicates that would split the data between two name spaces. It is preferable to use this system as the primary internal naming scheme.

Procedure

Figure 16:
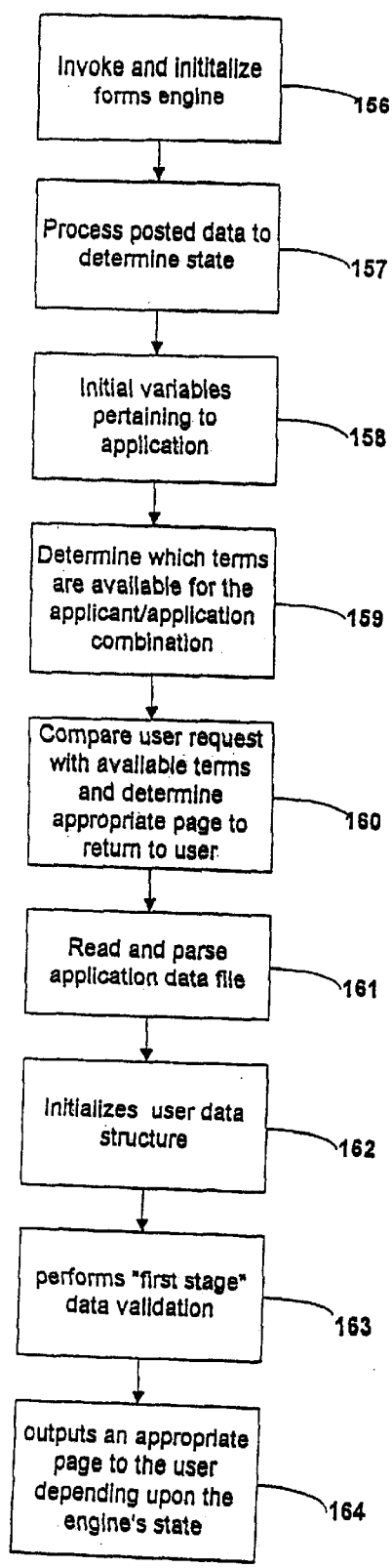
FIG. 16 shows the steps shows the steps that occur in a preferred embodiment when an applicant contacts the forms engine.

FIG. 16 shows the steps that occur in a preferred embodiment when an applicant contacts the forms engine. Step 156 shows that when an application contacts the URL of the forms engine, the forms engine is invoked and initializes itself by reading in libraries and initializing variables, such as global constants and data structures. For example, in the first embodiment of the Application Data File described above, an associative array of associative arrays that defines the form elements used by the engine to construct the application form is initialized.

In step 157, the forms engine looks for data posted from the Web page form. There may be no data at first, but after some information is entered and a page is saved or changed, data will post to the forms engine, which will perform first stage validation on the data. The forms engine then processes input arguments and posted data to determine the application state as described below.

Step 158 shows that the forms engine then makes database calls to initialize variables pertaining to the current admissions application (ID #, fee information, institution, etc.).

Step 159 shows that the forms engines determines which application terms (e.g. "Fall 1999", etc.) are available for this user/application combination. For example, the user may have already submitted and paid for a "Fall 1999" application and is now requesting the same application. This request may be to 1) review the submitted application or 2) apply for a new term. The engine needs to guarantee that the user does not submit the same application more than once per term. The search engine calculates submission state information to prevent a user from changing data in an already submitted application, and then resubmitting it in the mistaken belief that the data would be updated at the institution.

There are three outcomes of the calculation of submission state:

a. No currently available terms. Each term has a Begin-Date and an Expiration-Date. If the current time is before the Begin-Date or after the Expiration-Date, that term is unavailable. No terms would be available if all application windows for an institution are either expired or have not yet begun, or if the user has applied to all currently available terms.

b. User has applied for a term, and has not yet initiated a new transaction for this application.

c. User has an available "Active," that is, not submitted or paid, transaction for this application.

In step 160, the engine determines, based upon the availability of a term and the state of any pending or submitted applications, which application form is required by the user and generates the appropriate application form. If the user has an available active transaction, the engine will return the appropriate page of the application in an HTML form with any previously supplied data already filled in. If the user has already submitted the application and has no active transactions, an "Already Submitted" page is returned, with hypertext link(s) to "Printable" (uneditable) versions of the submitted application(s), and the option to fill out the application for a term other than the term(s) already applied for. If there are no available terms, a "No Available Terms" page is returned, which gives the user the option to fill out and save the application, but not submit it until a term is available. In the case that the user has previously submitted an application for the specified term and no other terms are available, a hybrid of the above two pages is returned, with links to printable version(s) of submitted application(s) and the option to fill in and save data but not submit the application until a new term is available.

In step 161, the forms engine reads and parses the "Application Data File" corresponding to the application to find the appropriate page of the application.

In step 162, the engine initializes a user data structure, preferably an associative array of key/value pairs or a data object in an Object-Oriented implementation Programming using data from the User Attribute Table.

If data has been posted, the forms engine performs first stage data validation in step 163.

If one or more data fail validation, the engine creates a "data correction page" and returns it to the user. This page repeats the text of the failed question, displays a message explaining why the data failed, and repeats the form element pertinent to that datum. When the user posts this page, first stage validation is applied to the incoming data, and if one or more are still in error, a new data correction page is returned. This process continues until all the data for that page have passed validation.

As described above, the first stage validation optionally checks for second stage required fields, thereby reducing the number of fields that will require data entry during the second stage validation. On each data correction page, the user has the option to enable/disable this feature.

In step 164, the forms engine outputs an appropriate page to the user depending upon the engine's state.

The front end, that is, the portion of the forms engine that processes incoming data from the user, is essentially one CGI program that determines the proper action by parsing information coming in from the Web form in combination with state information from the Transactions Table. For example, the user could be returning from a data correction page, the user may have hit the "save and send" button, or the user may have switched pages. The engine may look for posted data and process it, etc.

State

The forms engine can be in one of several possible states after analyzing incoming data. For example, the data may have failed validation and the forms engine, therefore, needs to output data correction page, or a user may have requested to go to page "x", so the forms engine needs to create and output page "x"; etc. (see discussion of state, below).

Most interactions between the user and the inventive system are through "front-end processing," which was described above with respect to FIG. 14. The response of the engine is dependent upon the current state. The Web, which is the communications conduit the system uses, is by definition stateless: When a browser (Web client) submits a request to a Web server, a connection is made between the two only long enough for the server to transmit the desired information. The server then drops the connection, and any information created by the client/server interaction is discarded by the server. The next time the client connects to the server, the slate is blank and they start that interaction from scratch.

The system needs a way to maintain state information between contacts. The system utilizes two state models to describe the states of two different aspects of the system: a "session state" applies to the front-end process of creating and returning Web forms, and a "transaction state" pertains to the state of the transaction, that is, the state for a particular user's application to an institution for a specific term. Transaction states include for example, active or submitted or paid or void.

Every page has hidden fields that provide state information. The session state can be determined by parsing the hidden fields returned with data. State information can include, for example, the version number of the application and the page that the user previously requested. For example, the hidden fields would indicate to the server whether a page is being returned because the applicant selected "Save, Pay, and Send" or whether the applicant merely requested a page flip. As another example, when first stage validation finds an error and returns a data correction page to the user, the data correction page includes hidden fields that indicate the page that the user was attempting to go to. When the data correction page is submitted, the engine parses the hidden fields to determine the state and returns the previously requested page to the user.

The current transaction state for a specific application/user combination is determined by looking up the application in the data base tables described above. For example, if the applicant requests an application for a term for which the applicant has already submitted an application, the engine determines that such is the case, and rather than returning the application, returns a page stating that the application was already submitted. The student is given the option of viewing the application in a printable, non-editable form, or of opening an application form for another term. The engine screens out the term already applied for when it returns the application. If no terms are currently available, a page is returned that states no terms are currently available, but the applicant is permitted to begin completing an application that can be saved until a term is available. In such a case, the "save and send" button is not available until a term is available. Thus, applicants can begin completing forms even before a term is available.

With regard to the front-end state model, the following is a list of the states the engine defined by the action that caused the engine to be in that state:

1. "Initial Contact"—The user is requesting the application form from outside of the engine. The engine will create the first page of the application, merge any matching user data, and return the form.

2. "Page Flip"—For multi-page applications, the user has come from page "x" and wants to go to page "y". The engine first applies front-end validation to the incoming data posted from page "x" (which may result in returning a data correction page), saves the validated data, generates page "x", merges any matching user data and returns the form.

3. "Explicit Save"—At the bottom of each page is a button that allows them to save the current page of data. Essentially, the action of the engine in this state is identical to the "page flip", but "x" equals "y" (i.e., the returned page is the same page number as the page posted from).

4. "Save and Send"—The user has elected to submit the completed application to the institution. The engine does front-end validation on the current page posted, saves data, does back-end validation on all data pertaining to the application, saves data to the User Attribute Sent Table, and passes control to the payment server.

5. "Data CRX (Correction) Page"—When either front-end or back-end validation has failed, the engine switches to this state, which causes the form generator to create a data correction page and hide in that page state information including the state the engine was in prior to switching to this state. (For example, if the user is on page 3 and chose to go to page 5, but errant data on page 3 lead to an intervening data correction page, the data correction page includes hidden data indicating the page flip to page 5). Once the data are successfully amended and the user posts the data correction page, the engine detects that the prior state was a "page flip" to page 5, and returns page 5 to the user. Similarly, if the user had selected "save and send" and got an intervening front-end or back-end validation data correction page, once corrected the post from that data correction page will then switch the engine into "save and send" mode, and the user will receive the payment page from the payment server.

6. "App Terms Page"—This state is entered when the applicant requests an application that was already submitted or for which no terms are available: (a) an "already submitted" page; or (b) a "no available terms" page. The engine will return either with hidden state information. When one of these pages is posted, the engine will then continually insert additional hidden state information into subsequent forms to ensure future behavior is in accordance with selection(s) the user made on those pages.

7. "Print Engine"—The engine is being called in print mode to deliver a "printable" (i.e., non-form) version of the application/user data.

8. "Exit"—The user has chosen the 'Finish Session' button on the application page, and the engine passes control to the user activity CGI, which displays a page of information about the applications the user has worked on and their status.

9. "Search"—The user has selected a search button to aid in the selection of a value for example, a country. The engine saves any validated data and displays a search page, which contains links back to the page of the application the user left. These links also cause the selected value to be passed into the engine, which then displays it appropriately in the form.

Figure 17:
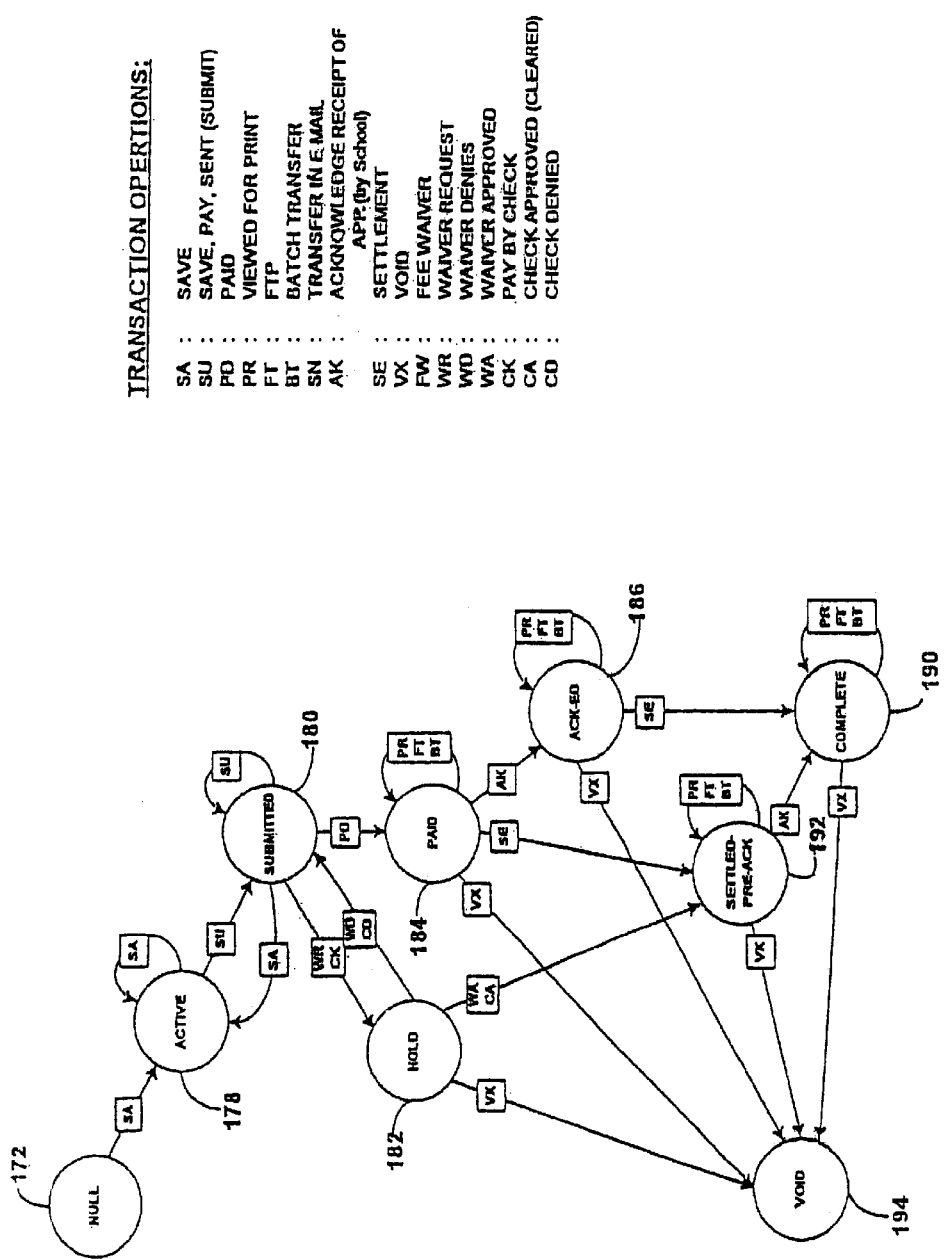
FIG. 17 shows the "back-end" states available during application processing.

FIG. 17 shows the back-end state model for an application, and the corresponding transaction operations that cause changes between states. Null state 172 is the state after an application has been created but before the application has been posted by the applicant. The application switches into the active state 178 when the applicant saves a page of the application or when the applicant attempts to save a page and an error prevents the page from being saved. When the application is submitted, it enters a submitted state 180. The applicant is preferably given a warning that no changes can be made to the application after payment is made and is given the option to amend the application. If the applicant indicates a desire to amend the application, or if the application fee is not paid, the application returns to active state 178 . If the applicant request a fee waiver or the applicant indicates that he desires to pay by check, the application enters a hold state 182 until the check clears or the fee waiver is approved by the institution. Fee waivers are used by institutions to encourage applications from qualified individuals who may not be able to afford the application fee.

After the application is submitted, the applicant pays for the application, which enters a paid state 184 until the payment is acknowledged by the institution or settled. In the paid state 184 and subsequent states, the application can be viewed for printing by the applicant or downloaded by a batch transfer or file transfer protocol by the institution. The application is then acknowledged by the institution and the payment is settled. Depending upon whether the acknowledgment or settlement occurs first, the application enters an acknowledged state 186 or a settled-pre acknowledgment state 192. After both settlement and acknowledgment occur, the application enters a completed state 190. The application can enter a void state 194 if it becomes unuseable, for example, because an applicant cancels the application or withdraws permission to provide the application information to the institution. Voided application are maintained in a separate database table.

Data Formatting

When application information is uploaded and acknowledged by the institution, the original application information remains archived in the applicant database in the User Attributes Sent table. The application can be printed, re-uploaded, etc. Institutions can request information related to all or a subset of their applications to see, for example, what new applications have been sent and the status of various applications. The data is available for data manipulation, such as for sorting on fields or presenting application information in various database views. For example, a school can look at applications sorted by test scores. The school could also look at all applications of students from a particular geographical area, or students who play a particular sport or instrument. The institution can perform statistical correlations between information on the application and grades achieved at the institution after matriculation to determine what characteristics of applicants correlate with success at the institution.

Not only are the individual data elements tailored to the specifications of a particular institution, the entire data set is formatted to conform to that institutions needs. The data formats may include 1) comma separated values, 2) tab delimited values, 3) fixed length formats, 4) name/value pairs, and 5) EDI 189. For all of these methods, of course, the data is ordered as required (e.g., Social Security number first, last name second, high school name 33rd, etc.).

The format of the entire data set is done via back-end utilities that run on the server and that utilize specially formatted text files containing data formatting descriptions and additional data-manipulation rules. These utilities are triggered when the institution's contact person accesses the administrative utility on the forms engine server and chooses to upload data sets.

Another implementation of the invention uses object-oriented programming and the Extensible Markup Language (XML), which is used to create a customized mark-up language related to applications processing. In this embodiment, most of the information about each applicant is stored in an XNL file corresponding to that applicant, although some basic account information about each applicant is still maintained in a data table. Information about each application is stored in an XML application description file. This implementation requires fewer files, thereby simplifying maintenance and reducing the run time overhead associated with reading and reconstructing applications from multiple files. First and second stage validation rules are maintained in the XML application description file. Unlike the previously described embodiment, initialization is only required when the web server is started, because the application persists, along with its database connections, as long as the server is operating.

An XML parser, typically written in Perl, parses the XML application description source file and invokes programs that implement by creating and saving binary objects the features specified by the XML tags. For example, the text between a <begin page> tag and an <end page> tag is used to create a page object having attributes defined by the text between the tags. Similarly, an object corresponding to an element of a page is created based upon the text between a <begin element> tag and an <end element> tag. The created objects define the application that is presented to the applicant.

Figure 18:
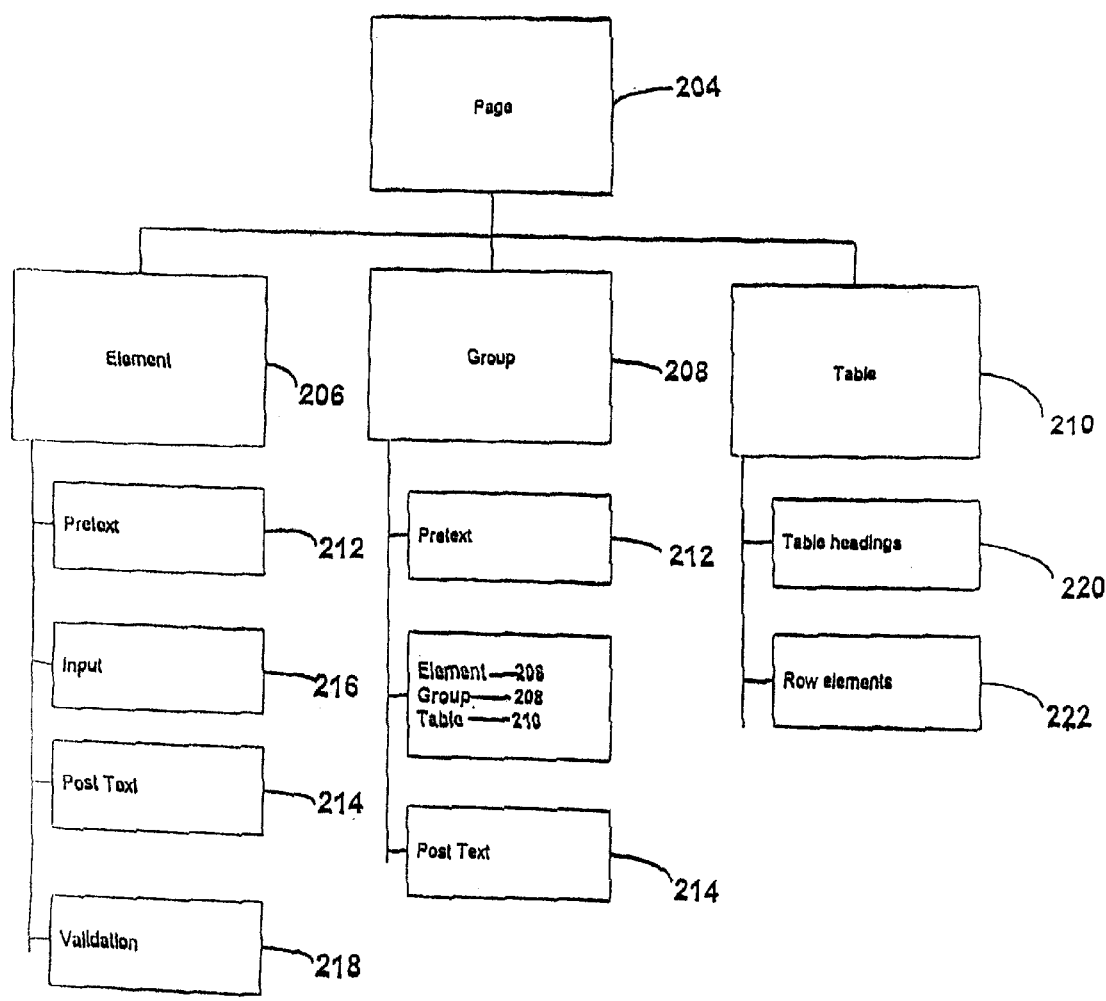
FIG. 18 is a simplified example of classes used in an object-oriented programming implementation of the invention.

FIG. 18 shows examples of binary objects created by the XML parser and the relationships between some of the objects. For example, FIG. 18 shows, that a page object 204 can include one or more element object 206, groups objects 208, and table objects 210. An element object 206, which can be instantiated for example as a question on the application, includes a pre-text element 212 and a post-text element 214 corresponding to text associated with the question, an input field element 216, and any validation rule elements 218. Groups objects 208 may also include a pre-text element 212 and a post-text element 214, as well as element objects 206, other group objects 208, and table objects 210. Table objects 210 can include table header objects 220 and row element objects 222. Skilled programmers can write many classes to customize an application and will understand that FIG. 18 is a greatly simplified example used to demonstration the principles of the embodiment.

The group object allows multiple elements to be associated with a group and eases the implementation of an adaptive application, in which the content of application pages sent to an applicant may depend upon the applicant's answers in previous pages. Whether an element or group is displayed depends upon the value of a display attribute, which can be used to speci the conditions under which the object is displayed on the screen or in printed reports. For example, a group of questions may belong to a "non-U.S. citizen" group object. Questions belonging to the non-U.S. citizen group object may request information such as visa type, alien registration number, and country of origin. If the applicant answers that he is a U.S. citizen, elements in the "non-U.S. citizen" group are not displayed. An adaptive application would also be useful for a higher education system that includes multiple schools or campuses. A single application file could be used, with the questions presented to the applicant depending upon the particular school the applicant chooses. Using a single application greatly simplifies maintenance of the application form.

Applicant information is similarly saved in an applicant XML file. Unlike the application description XML file, the applicant file is changed as information is posted by the applicant. Thus, the applicant XML file is re-saved each time that data is posted by the applicant.

Although the present invention has been described using an embodiment that processes college admission application forms, it is not limited to that application, but is applicable to processing any form, such as employment forms and student loan forms, such as for the PLUS student loan program While a preferred embodiment of the present invention has been shown and described, it will be apparent to those skilled in the art that many changes and modifications may be made without departing from the invention in its broader aspects. Because the computer and computer network fields are changing rapidly, it is expected that implementation of the invention will change significantly as technology evolves. The particular programming language and the type of database can be varied depending on the preferences of the programmer. Such changes in implementation, however, do not depart from the spirit and scope of the invention. The appended claims are therefore intended to cover all such changes and modifications as fall within the true spirit and scope of the invention.

What is claimed is:

1. A method of creating and processing over a computer network forms representing applications to different higher education institutions, comprising:

creating in response to a request from an applicant for an application to a first institution a first application form customized in accordance with the preferences of the first institution, the first application form including first form data fields for entering applicant information;

providing to the applicant over a computer network the first application form;

entering the applicant information in the first form data fields;

posting the applicant information entered into the first form data fields of the first application form to a server;

storing the posted applicant information in a database having a database field structure defined by multiple database fields, the database including multiple records, each record capable of storing information corresponding to each of the database fields;

creating in response to a request from the applicant for an application to a second institution a second application form customized in accordance with the preferences of the second institution, the second application form including second form data fields for entering applicant information, at least one of the second form data fields corresponding to applicant information not entered into the first form data fields;

automatically inserting into some of the second form data fields applicant information from the database;

providing to the applicant over a computer network the second application form;

entering applicant information into the second form data fields into which information was not inserted from the data storage or into which the data inserted from the data storage is to be changed;

posting the applicant information entered into the second form data fields to the server; and automatically storing the applicant information entered into the second form data fields into the database by adding new records to the database, the automatic storing of the applicant information not altering the database field structure, thereby allowing new form data fields corresponding to applicant information not previously requested to be added to an application form without requiring alterations of existing application forms or of programs that access the database, whereby customized applications to different institutions share data through common, extensible data storage.

2. The method of claim 1 in which creating a first application form customized in accordance with the preferences of the first institution includes generating a first application in accordance with stored application description information and in which a modified first application can be generated by modifying the application description information without rewriting the computer program that creates the first application.

3. The method of claim 1 in which posting applicant information entered into the first form data fields of the first application includes verifying that pre-specified application information is present and meets pre-specified criteria.

4. The method of claim 1 in which posting applicant information entered into the first form data fields of the first application and posting applicant information entered into the second form data fields of the second application each includes the steps of posting data from a single page of the application and of posting data from the completed application, and in which posting a single page includes verifying that some specific information is present and meets pre-specified criteria and in which posting data from the completed application includes verifying that the information meets criteria specified by the corresponding institution.

5. The method of claim 1 in which creating an application form customized in accordance with the preferences of a first institution includes creating an application form identified with the brand of the first institution and in which creating an application form customized in accordance with the preferences of a second institution a second application includes creating an application form identified with the brand of the second institution.

6. The method of claim 1 further comprising transmitting the applicant information to the first institution in a first format specified by the first institution and transmitting the applicant information to the second institution in a second format specified by the second institution, the second format being different from the first format.

7. The method of claim 6 further comprising making applicant information from multiple applications to the first institution from different applicants available on line to the first institution for analysis after transmitting the applicant information to the first institution.

8. The method of claim 7 in which making applicant information from multiple applications available to the first institution includes making application information selectively available to various personnel at the institution.

9. The method of claim 1 in which automatically storing the applicant information is performed by a third party application servicer.

10. The method of claim 9 in which posting the first applicant information and posting the second applicant information include paying application fees for the first and second applications and in which the third party servicer processes the application fee.

11. The method of claim 1 in which storing the posted applicant information in a database having a database field structure defined by multiple database fields includes parsing the applicant information within a into data elements, the data elements being separately stored and identified, thereby allowing the data elements to be separately retrieved and rearranged in subsequent applications.

12. The method of claim 11 in which automatically inserting applicant information from the database includes automatically inserting applicant information representing combined elements into a single one of the second form data fields.

13. The method of claim 1 in which:

the first form data fields include first form data field labels;

at least some of the second form data fields include second form data field labels different from the first form data field labels for form data fields corresponding to the same data; and storing the posted applicant information and automatically inserting into some of the second form data fields applicant information from the database are independent of the labels used in the first application form and the second application form, thereby allowing each institution to customize the appearance of its corresponding application, while still permitting information to be shared across applications.

14. The method of claim 1 in which the first form data fields and the second form data fields are formatted and in which at least some of the second form data fields are formatted differently from the corresponding first form data fields and in which storing the posted applicant information and automatically inserting applicant information from the database is independent of the data field format, thereby allowing each institution to customize the appearance of its corresponding application, while still permitting information to be shared across applications.

15. The method of claim 1 in which providing the first application form comprises providing multiple form pages and in which posting the first applicant information to a server includes posting multiple form pages to the server.

16. The method of claim 15 in which the content of a page of the first application depends upon applicant information posted in a previous page of the first application.

17. The method of claim 1 in which the database includes a relational database or XML data.

18. The method of claim 1 in which the database stores retadata describing the data.

19. The method of claim 18 in which the metadata includes validation rules for the data.

20. The method of claim 18 in which the metadata specifies the sharing between applications or the accessibility of the data.

21. A system for creating and processing customized forms for unrelated institutions using a common third party data storage over a computer network, the system including:

a server computer operated by the third party and in data communication over a data network with a client computer for requesting a form and for entering information onto the form;

first data storage in communication with the server computer and including form description information specifying the content and appearance of each customized form;

second data storage in communication with the server computer and including user information posted from the client computer, the second data storage including a database having a database field structure defined by multiple database fields, the database including multiple records, each record capable of storing information corresponding to each of the database fields; and a forms engine program operating on the server computer for generating a form from the form description information in response to a request for the form transmitted from the client computer over the computer network, the form including fields for the user to enter user information, the forms engine program automatically populating the fields for user information with user information available from the second data storage, accepting user information entered on the form by the user, and storing the newly entered information in the second data storage for automatically populating subsequent forms, the user information entered by the user including at least some information not entered on a previous form by the user, the forms engine automatically storing the entered information into the database by adding new records to the database, the automatic storing of the user information not altering the database field structure, thereby allowing new user information not previously requested to be added to a form without requiring alterations of existing forms or alterations of programs that access the database.

22. The system of claim 21 in which the forms engine program generates a form that includes branding information identifying the particular institution to which the form is directed.

23. The system of claim 21 in which the forms engine program generates customized forms that include labels for data entry fields and in which at least some of the labels are different for the same user information on different ones of the customized forms.

24. The system of claim 21 in which the same user information is requested using differently styled menus on different ones of the customized forms.

25. The system of claim 21 in which at least some of the user information is parsed into smaller elements before storage, the smaller elements being stored in the database and being individually retrievable for insertion into subsequent forms.

26. The system of claim 21 in which the user information stored in the second database is in the form of user attributes and in which at least some of the user attributes have properties that specify information about the attribute.

27. The system of claim 21 further comprising means for transmitting in a format specified by the institution information user data from a completed form to the institution associated with the form.

28. The system of claim 21 further comprising means for verifying information in a form, the verification means including verification criteria common to all forms and verification criteria for a specific institutions.

29. The system of claim 21 in which the forms engine generates a form comprising multiple pages and in which the content of at least one of the multiple pages depends upon previously supplied user information.

30. The system of claim 21 in which the first or second data storage comprises one or more XML files stored on a computer readable medium.

31. The system of claim 21 in which the first or second data storage comprises one or more relational database tables stored on a computer readable medium.

32. A method of providing customized applications to institutions, the applications sharing a common database, the method comprising:

providing at least two application information files, each describing a customized application for an institution;

providing a database for storing applicant information entered on an application and for providing applicant information for inserting into subsequent applications, the database having a database field structure defined by multiple database fields, the database including multiple records, each record capable of storing information corresponding to each of the database fields;

generating a customized application in response to a request over a computer network from an applicant, the application form and content being specified by one of the at least two application information files, the application including multiple form data fields for entering applicant information;

populating the form data fields of the customized application using applicant information from the database;

transmitting the customized application over a computer network to a requesting applicant;

completing form data fields of the application that were not populated with applicant information from the database, at least one of the form data fields corresponding to applicant information not entered into the form data fields of an application previously completed by the requesting applicant; and.

automatically storing the applicant information entered into the form data fields into the database by adding new records to the database, the automatic storing of the applicant information not altering the database field structure, thereby allowing new form data fields corresponding to applicant information not previously requested to be added to an application form without requiring alterations of existing application forms or of programs that access the database.

33. The method of claim 32 which completing fields of the application that were not populated from the database includes overwriting with new values fields that were populated from the data storage, the new values being stored in the data storage in place of the existing values.

34. The method of claim 32 in which providing a database for storing information includes providing a database that is extensible without reprogramming the program for generating the customized application, thereby allowing an institution to readily request and store new information not previously stored.

35. The method of claim 34 in which generating a customized application includes generating an application that includes the logotype of the institution.

36. The method of claim 32 in which the database stores metadata describing the data.

37. The method of claim 36 in which the metadata describes permissible values for the data and further comprising comparing the applicant data in the completed form data fields with the permissible values.

38. The method of claim 36 in which the meta data describes conditions under which questions on the customized application are displayed.

39. The method of claim 32 in which the database includes a relational database.

40. The method of claim 32 in which the database includes XML data.

41. The method of claim 32 in which the customized application includes multiple pages.

42. The method of claim 41 in which the content of one of the multiple page depends the fields completed by an applicant on a previous one of the multiple pages.

* * * * *

UNITED STATES PATENT AND TRADEMARK OFFICE
CERTIFICATE OF CORRECTION

PATENT NO. : 6,345,278 C1
APPLICATION NO. : 90/008322
DATED : April 7, 2009
INVENTOR(S) : Michael D. Hitchcock et al.

It is certified that error appears in the above-identified patent and that said Letters Patent is hereby corrected as shown below:

Cover Page, item (73), under "Assignee" heading, please change "Silicon Valley Bank, Santa Clara, CA (US)" to read -- CollegeNET, Inc., Portland, OR (US) --.

Signed and Sealed this
Second Day of April, 2013

Teresa Stanek Rea
*Acting Director of the United States Patent and Trademark Office*

(12) EX PARTE REEXAMINATION CERTIFICATE (6752nd)
United States Patent
Hitchcock et al.

(10) Number: US 6,345,278 C1
(45) Certificate Issued: Apr. 7, 2009

(54) UNIVERSAL FORMS ENGINE

(75) Inventors: Michael D. Hitchcock, Portland, OR (US); James H. Wolfston, Jr., West Linn, OR (US); John W. Stedman, Beaverton, OR (US); Andreè J. Hertz, Beaverton, OR (US); Raymond L. Price, Tualatin, OR (US)

(73) Assignee: Silicon Valley Bank, Santa Clara, CA (US)

Reexamination Request:
No. 90/008,322, Nov. 8, 2006

Reexamination Certificate for:
Patent No.: 6,345,278
Issued: Feb. 5, 2002
Appl. No.: 09/325,533
Filed: Jun. 3, 1999

Related U.S. Application Data

(60) Provisional application No. 60/088,123, filed on Jun. 4, 1998.

(51) Int. Cl.
*G06F 17/24* (2006.01)

(52) U.S. Cl. .................. 707/100; 707/102; 707/104.1; 715/234

(58) Field of Classification Search .................. None
See application file for complete search history.

(56) References Cited

U.S. PATENT DOCUMENTS

| 4,645,873 A | 2/1987 | Chomet |
| 4,799,156 A | 1/1989 | Shavit et al. |
| 4,831,526 A | 5/1989 | Luchs et al. |
| 4,992,940 A | 2/1991 | Dworkin |
| 5,077,666 A | 12/1991 | Brimm et al. |
| 5,086,394 A | 2/1992 | Shapira |
| 5,129,086 A | 7/1992 | Coyle, Jr. et al. |
| 5,187,787 A | 2/1993 | Skeen et al. |
| 5,193,057 A | 3/1993 | Longfield |
| 5,197,004 A | 3/1993 | Sobotka et al. |
| 5,319,542 A | 6/1994 | King, Jr. et al. |
| 5,325,478 A | 6/1994 | Skelton et al. |
| 5,367,619 A | 11/1994 | Dipaolo et al. |
| 5,404,294 A | 4/1995 | Karnik |
| 5,410,646 A | 4/1995 | Tondevold et al. |
| 5,410,675 A | 4/1995 | Shreve et al. |
| 5,450,537 A | 9/1995 | Hirai et al. |
| 5,455,948 A | 10/1995 | Poole et al. |
| 5,490,243 A | 2/1996 | Millman et al. |
| 5,495,565 A | 2/1996 | Millard et al. |
| 5,563,999 A | 10/1996 | Yaksich et al. |
| 5,611,052 A | 3/1997 | Dykstra et al. |
| 5,640,577 A | 6/1997 | Scharmer |
| 5,655,085 A | 8/1997 | Ryan et al. |
| 5,666,502 A | 9/1997 | Capps |
| 5,671,279 A | 9/1997 | Elgamal |
| 5,671,409 A | 9/1997 | Fatseas et al. |

(Continued)

OTHER PUBLICATIONS

Magdalena Yesil, "Creating the Virtual Store—Taking your web site from browsing to buying," published by John Wiley & Sons, Inc., Published Nov. 8, 1996.

(Continued)

*Primary Examiner*—Mary Steelman

(57) ABSTRACT

A forms engine allows data sharing between customizable on-line forms, such as college admissions applications. After an applicant completes an application, the data is saved in a database and automatically populates fields in subsequent application forms. Each form is branded for its institution and forms for different institutions differ in appearance and content so that the presence of the third party servicer is transparent to the applicant. The system is extensible without programming, allowing new applicant attributes to be readily incorporated into the system and allowing the content and appearance of the application to be readily changed by changing the description file. Information stored about each attribute allows the specification of data validation rules and data sharing and grouping rules, as well as dependency rules that permit application page content to depend on applicant's responses on a previous page.

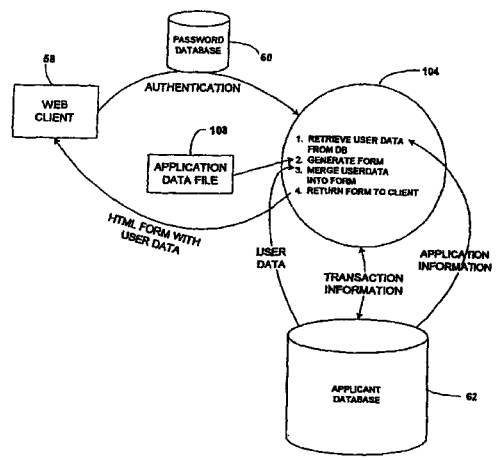

U.S. PATENT DOCUMENTS

| | | |
|---|---|---|
| 5,699,528 A | 12/1997 | Hogan |
| 5,704,029 A | 12/1997 | Wright, Jr. |
| 5,715,314 A | 2/1998 | Payne et al. |
| 5,715,453 A | 2/1998 | Stewart |
| 5,717,923 A | 2/1998 | Dedrick |
| 5,724,424 A | 3/1998 | Gifford |
| 5,724,523 A | 3/1998 | Longfield |
| 5,729,594 A | 3/1998 | Klingman |
| 5,734,887 A | 3/1998 | Kingberg et al. |
| 5,745,681 A | 4/1998 | Levine et al. |
| 5,758,126 A | 5/1998 | Daniels et al. |
| 5,758,324 A | 5/1998 | Hartman et al. |
| 5,758,328 A | 5/1998 | Giovannoli |
| 5,761,673 A | 6/1998 | Bookman et al. |
| 5,774,670 A | 6/1998 | Montulli |
| 5,774,887 A | 6/1998 | Wolff et al. |
| 5,784,562 A | 7/1998 | Diener |
| 5,794,259 A | 8/1998 | Kikinis |
| 5,802,518 A | 9/1998 | Karaev et al. |
| 5,819,287 A | 10/1998 | Tsuoka |
| 5,832,497 A | 11/1998 | Taylor |
| 5,835,712 A | 11/1998 | DuFresne |
| 5,845,075 A | 12/1998 | Uhler et al. |
| 5,845,300 A | 12/1998 | Comer et al. |
| 5,859,972 A | 1/1999 | Subramaniam et al. |
| 5,870,473 A | 2/1999 | Boesch et al. |
| 5,872,640 A | 2/1999 | Cohen et al. |
| 5,878,403 A | 3/1999 | DeFrancesco et al. |
| 5,884,309 A | 3/1999 | Vanechanos, Jr. |
| 5,886,693 A | 3/1999 | Ho et al. |
| 5,890,175 A | 3/1999 | Wong et al. |
| 5,897,622 A | 4/1999 | Blinn et al. |
| 5,903,721 A | 5/1999 | Sixtus |
| 5,933,811 A | 8/1999 | Angles et al. |
| 5,943,424 A | 8/1999 | Berger et al. |
| 5,961,601 A | 10/1999 | Iyengar |
| 5,963,915 A | 10/1999 | Kirsch |
| 5,963,925 A | 10/1999 | Kolling et al. |
| 5,963,952 A | 10/1999 | Smith |
| 5,978,768 A | 11/1999 | McGovern et al. |
| 5,983,227 A | 11/1999 | Nazem et al. |
| 5,987,480 A | 11/1999 | Donohue et al. |
| 5,999,939 A | 12/1999 | De Hilster et al. |
| 6,003,007 A | 12/1999 | DiRienzo |
| 6,014,645 A | 1/2000 | Cunningham |
| 6,021,202 A | 2/2000 | Anderson et al. |
| 6,028,938 A | 2/2000 | Malkin et al. |
| 6,029,149 A | 2/2000 | Dykstra et al. |
| 6,035,119 A | 3/2000 | Massena et al. |
| 6,035,276 A | 3/2000 | Newman et al. |
| 6,055,541 A | 4/2000 | Solecki et al. |
| 6,058,373 A | 5/2000 | Blinn et al. |
| 6,088,700 A | 7/2000 | Larsen et al. |
| 6,101,482 A | 8/2000 | DiAngelo |
| 6,122,657 A | 9/2000 | Hoffman, Jr. et al. |
| 6,141,666 A | 10/2000 | Tobin |
| 6,149,055 A | 11/2000 | Gatto |
| 6,178,409 B1 | 1/2001 | Weber et al. |
| 6,189,029 B1 | 2/2001 | Fuerst |
| 6,199,079 B1 | 3/2001 | Gupta et al. |
| 6,237,035 B1 | 5/2001 | Himmel et al. |
| 6,247,029 B1 | 6/2001 | Kelley et al. |
| 6,279,112 B1 | 8/2001 | O'toole, Jr. et al. |
| 6,334,114 B1 | 12/2001 | Jacobs et al. |
| 6,341,351 B1 | 1/2002 | Muralidhran et al. |
| 6,421,693 B1 | 7/2002 | Nishiyama et al. |
| 6,460,071 B1 | 10/2002 | Hoffman |
| 6,484,149 B1 | 11/2002 | Jammes et al. |
| 6,535,883 B1 | 3/2003 | Lee et al. |
| 6,757,674 B2 | 6/2004 | Wiens et al. |
| 6,963,843 B1 | 11/2005 | Takatsu et al. |
| 2007/0061777 A1 | 3/2007 | Vashl et al. |

OTHER PUBLICATIONS

CollegeNET, Inc., "Virginia Tech Describe Web Admissions Application Advantages to Standing Room Only Crowd At AACRAO," published by CollegeNET, Inc., Published Apr. 20, 1997.

Shishir Gundavaram, "CGU Programming on the World Wide Web," published by O'Reilly & Associates, Inc., Published Mar. 1995.

Jim Ellis, "Tackling Admission with a PC," published by Business Week, Published Nov. 11, 1996.

Susan B. Peck, "WebSite Professional—Website Professional Advanced Topics", Published Jun. 1996.

Business Wire, "On–line Applications Now On CollegeNET," Published Sep. 20, 1995.

National Computer System, Inc, "Entrata," Published Apr. 18, 1997.

CollegeNet, Inc., "New World Speed Record Set For Applying to College" Published Aug. 28, 1996.

Deb Riechmann, "Now, you can surf the Net into college—Online access help speed applications to the school to your choice," Syracuse Herald–Journal, Published Dec. 2, 1996.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–17, 21–29, 31–37, 39, 41 and 42 is confirmed.

Claims 18 and 38 are determined to be patentable as amended.

Claims 19 and 20, dependent on an amended claim, are determined to be patentable.

New claims 43–47 and 48 are added and determined to be patentable.

Claims 30 and 40 were not reexamined.

18. The method of claim 1 in which the database stores [retadata] *metadata* describing the data.

38. The method of claim 36 in which the [meta data] *metadata* describes conditions under which questions on the customized application are displayed.

*43. The method of claim 1 in which storing the posted applicant information in a database includes storing the posted applicant information in a table that includes in each row a user identifier, attribute identifier, and a data value for the attribute.*

*44. The method of claim 1 in which the storing posted applicant information includes storing values corresponding to user attributes, the value for each attribute being stored in a different record in a user attribute table and further comprising, when the posted applicant information includes an attribute value not requested on a form previously completed by the applicant, adding a new record corresponding to the requested attribute to the user attribute table.*

*45. The system of claim 21 in which the forms engine stores user information in a table that includes in each row a user identifier, attribute identifier, and a data value for the attribute.*

*46. The system of claim 21 in which the user information includes values for user attributes and in which the forms engine stores each attribute value of a user in a different record in a user attribute table and in which when a form requests an attribute value not requested on a form previously completed by the user, the forms engine adds a new record corresponding to the requested attribute value to the user attribute table.*

*47. The method of claim 32 in which automatically storing the applicant information includes storing applicant information in a table that includes in each row a user identifier, attribute identifier, and a data value for the attribute.*

*48. The method of claim 32 in which automatically storing the applicant information includes storing values corresponding to user attributes, the value for each attribute being stored in a different record in a user attribute table and further comprising, when an application requests an attribute value not requested on a form previously completed by the applicant, adding a new record corresponding to the requested attribute to the user attribute table.*

\* \* \* \* \*